(12) United States Patent
Wakizaka et al.

(10) Patent No.: US 8,187,704 B2
(45) Date of Patent: May 29, 2012

(54) OPTICAL FILM, POLARIZING PLATE AND IMAGE DISPLAY DEVICE

(75) Inventors: Daiki Wakizaka, Minami-Ashigara (JP); Taiji Katsumata, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 788 days.

(21) Appl. No.: 12/238,261

(22) Filed: Sep. 25, 2008

(65) Prior Publication Data

US 2009/0081447 A1 Mar. 26, 2009

(30) Foreign Application Priority Data

Sep. 25, 2007 (JP) ................. P2007-247738

(51) Int. Cl.
*B32B 5/16* (2006.01)
*C08L 67/00* (2006.01)

(52) U.S. Cl. .......... 428/323; 428/1.3; 523/205; 524/539

(58) Field of Classification Search .................. None
See application file for complete search history.

(56) References Cited

U.S. PATENT DOCUMENTS

| | | | | |
|---|---|---|---|---|
| 6,005,137 | A * | 12/1999 | Moore et al. ................. | 560/139 |
| 6,555,288 | B1 * | 4/2003 | Xu et al. ..................... | 430/270.1 |
| 7,371,439 | B2 | 5/2008 | Matsunaga et al. | |
| 2005/0038137 | A1 | 2/2005 | Yoshihara et al. | |
| 2006/0147177 | A1 | 7/2006 | Jing et al. | |
| 2007/0206286 | A1 * | 9/2007 | Fukushige et al. ............ | 359/580 |

FOREIGN PATENT DOCUMENTS

| | | |
|---|---|---|
| JP | 2003-222702 A | 8/2003 |
| JP | 2005-535934 A | 11/2005 |
| JP | 2006-45159 A | 2/2006 |
| WO | WO-2006/101218 A1 | 9/2006 |

* cited by examiner

*Primary Examiner* — Callie Shosho
*Assistant Examiner* — Patrick English
(74) *Attorney, Agent, or Firm* — Birch, Stewart, Kolasch & Birch, LLP

(57) ABSTRACT

An optical film, includes: a transparent support; and at least one low refractive index layer, wherein the at least one low refractive index layer is a layer formed from a coating composition containing: (A) an inorganic fine particle; (B) a fluorine-containing copolymer; and (C) a polyfunctional fluorine-containing acrylate, and the polyfunctional fluorine-containing acrylate (C) is represented by the following structural formula:

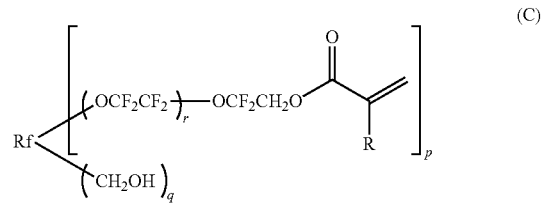

wherein Rf represents a (p+q)-valent perfluoro saturated hydrocarbon group having a carbon number of 1 to 20, which may have an ether bond; p represents an integer of 2 to 10; q represents an integer of 0 to 8, provided that (p+q) represents an integer of 2 to 10; r represents an integer of 0 to 100; and R represents a hydrogen atom, a methyl group, a fluorine atom or a trifluoromethyl group.

11 Claims, No Drawings

OPTICAL FILM, POLARIZING PLATE AND IMAGE DISPLAY DEVICE

BACKGROUND OF THE INVENTION

1. Field of the Invention

The present invention relates to an optical film, a polarizing plate using the optical film, and an image display device using the optical or polarizing plate on the outermost surface of the display.

2. Description of the Related Art

In an image display device such as cathode ray tube display (CRT), plasma display panel (PDP), electroluminescent display (ELD) and liquid crystal display (LCD), an antireflection film is generally disposed on the outermost surface of the display so as to reduce the reflectance by utilizing the principle of optical interference and thereby prevent the reduction in contrast due to reflection of outside light or prevent the disturbing reflection of an image.

Such an antireflection film can be generally produced by forming, on a support, a low refractive index layer having a refractive index lower than that of the support to an appropriate film thickness. In order to realize a low reflectance, a material having a refractive index as low as possible is preferably used for the low refractive index layer.

Also, the antireflection film is used on the outermost surface of a display and therefore, requires high scratch resistance. In order to realize high scratch resistance in a thin film with a thickness of around 100 nm, strength of the film itself and firm adhesion to the underlying layer are necessary. For increasing the film strength, it is known to add an inorganic fine particle into the film.

As for the inorganic fine particle, in addition to the increase of the film strength, an attempt to reduce the refractive index by adding a hollow fine particle is being made. At this time, addition of an inorganic fine particle in a sufficiently large amount within the range not causing reduction in the film strength due to insufficient binder is important.

On the other hand, for reducing the refractive index of a material, a method of introducing a fluorine atom is known, and it has been proposed to use a fluorine-containing crosslinking material (see, JP-A-2003-222702 (the term "JP-A" as used herein means an "unexamined published Japanese patent application")).

A technique of adding an inorganic fine particle to a fluorine-containing crosslinking material for forming a film having a low refractive index and excellent scratch resistance is also disclosed (JP-T-2005-535934 (the term "JP-T" as used herein means a "published Japanese translation of a PCT patent application")). However, in this case, dispersibility of the fine particle is bad and when the fine particle is added in a large amount, the coated film may be whitened, which is in need of improvement.

As regards this improvement, addition of a dispersant for the inorganic fine particle may be considered, but a normal dispersant tends to increase the refractive index and decrease the strength of the coated film. Therefore, a technique of improving dispersibility of the fine particle and suppressing whitening of the coated film without decreasing the film strength and increasing the refractive index is being expected.

Also, a fluorine-based compound which can be usefully used as a lubricant, a surfactant or a water-repelling oil-repelling material has been proposed (JP-A-2006-045159). However, this compound is a special compound using a fluorine-based solvent and cannot necessarily satisfy the scratch resistance, and an improvement is being demanded.

SUMMARY OF THE INVENTION

One aspect of the present invention is to provide an antireflection film ensuring that when a low refractive index layer is formed using a fluorine-containing material and an inorganic fine particle, the refractive index is low, the scratch resistance and antifouling durability are excellent and whitening (white turbidity) due to aggregation of inorganic fine particles is reduced. Another aspect of the present invention is to provide a polarizing plate and an image display device each using the optical film.

As a result of intensive studies to solve the above-described problems, the present inventors have found that those problems can be solved and the aspects can be achieved by the following constructions. The present invention has been accomplished based on this finding.

(1) An optical film, comprising:
a transparent support; and
at least one low refractive index layer,
wherein the at least one low refractive index layer is a layer formed from a coating composition containing: (A) an inorganic fine particle; (B) a fluorine-containing copolymer; and (C) a polyfunctional fluorine-containing acrylate, and
the polyfunctional fluorine-containing acrylate (C) is represented by the following structural formula:

$$\text{Rf} \underbrace{\left[ (\text{OCF}_2\text{CF}_2)_r - \text{OCF}_2\text{CH}_2\text{O} - \overset{\displaystyle\text{O}}{\underset{\displaystyle R}{\text{C}}} = \text{CH}_2 \right]_p}_{} \underbrace{(\text{CH}_2\text{OH})_q}_{} \quad (C)$$

wherein Rf represents a (p+q)-valent perfluoro saturated hydrocarbon group having a carbon number of 1 to 20, which may have an ether bond;
p represents an integer of 2 to 10;
q represents an integer of 0 to 8, provided that (p+q) represents an integer of 2 to 10;
r represents an integer of 0 to 100; and
R represents a hydrogen atom, a methyl group, a fluorine atom or a trifluoromethyl group.

(2) The optical film as described in (1) above,
wherein the inorganic fine particle (A) has a size of 5 to 120 nm and accounts for 10 to 70 mass % based on the entire solid content in the coating composition.

(3) The optical film as described in (1) or (2) above,
wherein the inorganic fine particle (A) is surface-treated with at least one of a hydrolysate of an organosilane compound and a partial condensate thereof.

(4) The optical film as described in any of (1) to (3) above,
wherein at least one kind of the inorganic fine particle (A) is a particle having a cavity in an inside of the particle.

(5) The optical film as described in any of (1) to (4) above,
wherein the coating composition further contains (D) a non-fluorine-containing polyfunctional monomer.

(6) The optical film as described in any of (1) to (5) above,
wherein in the polyfunctional fluorine-containing acrylate (C), r is an integer of 0 to 4, p is an integer of 3 to 6 and q is an integer of 0 to 3, provided that (p+q) is an integer of 3 to 6.

(7) The optical film as described in (6) above,
wherein in the polyfunctional fluorine-containing acrylate (C), r is 0 or 1, p is an integer of 3 to 6 and q is an integer of 0 to 3, provided that (p+q) is an integer of 3 to 6.

(8) The optical film as described in any of (1) to (7) above, wherein a content of (C) the polyfunctional fluorine-containing acrylate in the coating composition is from 5 to 50 mass % based on the entire solid content of the coating composition.

(9) The optical film as described in any of (1) to (8) above, wherein the coating composition further contains (E) a polysiloxane-based compound.

(10) A polarizing plate, comprising:
at least two protective films; and
a polarizing film between the at least two protective films,
wherein at least one of the at least two protective films is the optical film as described in any of (1) to (9) above.

(11) An image display device, comprising:
the optical film as described in any of (1) to (9) above or the polarizing plate as described in (10) above on the outermost surface of the display.

DETAILED DESCRIPTION OF THE INVENTION

An embodiment of the present invention is an optical film comprising a transparent support having thereon at least one low refractive index layer, wherein the low refractive index layer is a layer formed of a coating composition containing (A) an inorganic fine particle, (B) a fluorine-containing copolymer and (C) a polyfunctional fluorine-containing acrylate (hereinafter sometimes referred to as "the coating composition of the present invention") and the polyfunctional fluorine-containing acrylate (C) is represented by the following structural formula:

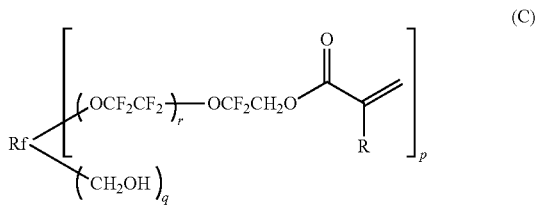

(wherein Rf represents a (p+q)-valent perfluoro saturated hydrocarbon group having a carbon number of 1 to 20, which may have an ether bond, p represents an integer of 2 to 10, q represents an integer of 0 to 8, provided that (p+q) represents an integer of 2 to 10, r represents an integer of 0 to 100, and R represents a hydrogen atom, a methyl group, a fluorine atom or a trifluoromethyl group).

The inorganic fine particle (A), fluorine-containing copolymer (B) and polyfunctional fluorine-containing acrylate (C), which are contained in the coating composition of the present invention, are described in detail below.

[Component (A) Constituting Low Refractive Index Layer of the Present Invention]
(Inorganic Fine Particle)

The inorganic fine particle which can be used for the low refractive index layer of the present invention is described. In the present invention, from the standpoint of reducing the refractive index and improving the scratch resistance, an inorganic fine particle is preferably used in the low refractive index layer. The inorganic particle is preferred to have the average particle size of from 5 to 120 nm, but in view of reduction in the refractive index, an inorganic low-refractive-index particle is preferred.

The inorganic particle includes, because of low refractive index, a magnesium fluoride fine particle and a silica fine particle. Particularly, in view of refractive index, dispersion stability and cost, a silica fine particle is preferred. The size (primary particle diameter) of the inorganic particle is preferably from 5 to 120 nm, more preferably from 10 to 100 nm, still more preferably from 20 to 100 nm, and most preferably from 40 to 90 nm.

If the particle diameter of the inorganic fine particle is too small, the effect of improving the scratch resistance decreases, whereas if it is excessively large, fine irregularities are generated on the low refractive index layer surface and the appearance (e.g., dense blackness) or integrated reflectance may be deteriorated. The inorganic fine particle may be crystalline or amorphous and may be a monodisperse particle or may be even an aggregate particle as long as the predetermined particle diameter is satisfied. The shape is most preferably spherical but even if indefinite form, there arises no problem.

The coated amount of the inorganic fine particle is preferably from 1 to 100 mg/m$^2$, more preferably from 5 to 80 mg/m$^2$, still more preferably from 10 to 60 mg/m$^2$. If the coated amount is too small, the effect of improving the scratch resistance decreases, whereas if it is excessively large, fine irregularities are generated on the low refractive index layer surface and the appearance (e.g., dense blackness) or integrated reflectance may be deteriorated.

(Porous or Hollow Fine Particle)

In order to reduce the refractive index, a porous or hollow-structure fine particle is preferably used as at least one inorganic fine particle (in the context of the present invention, the "hollow-structure fine particle" as used here is sometimes referred to as "a particle having a cavity in the inside"). The void percentage of such a particle is preferably from 10 to 80%, more preferably from 20 to 60%, and most preferably from 30 to 60%. The void percentage of the particle is preferably in the above-described range from the standpoint of reducing the refractive index and maintaining the durability of the particle.

In the case where the porous or hollow fine particle is silica, the refractive index of the fine particle is preferably from 1.10 to 1.40, more preferably from 1.15 to 1.35, and most preferably from 1.15 to 1.30. The refractive index used here indicates a refractive index of the particle as a whole and does not indicate a refractive index of only silica in the outer shell forming the silica particle.

The production method of the porous or hollow silica is described, for example, in JP-A-2001-233611 and JP-A-2002-79616. In particular, a particle where a cavity is present inside the shell and pores of the shell are closed is preferred. Incidentally, the refractive index of such a hollow silica particle can be calculated by the method described in JP-A-2002-79616.

The coated amount of the porous or hollow silica is preferably from 1 to 100 mg/m$^2$, more preferably from 5 to 80 mg/m$^2$, still more preferably from 10 to 60 mg/m$^2$. If the coated amount is too small, the effect of reducing the refractive index or improving the scratch resistance decreases, whereas if it is excessively large, fine irregularities are generated on the low refractive index layer surface and the appearance (e.g., dense blackness) or integrated reflectance may be deteriorated.

The average particle diameter of the porous or hollow silica is preferably from 30 to 150%, more preferably from 35 to 80%, still more preferably from 40 to 60%, of the thickness of the low refractive index layer. In other words, when the thickness of the low refractive index layer is 100 nm, the particle diameter of the hollow silica is preferably from 30 to 150 nm, more preferably from 35 to 100 nm, still more preferably from 40 to 65 nm. In the present invention, the particle having a cavity in the inside may have a size distribution and the coefficient of variation thereof is preferably from 60 to 5%, more preferably from 50 to 10%. Also, two kinds or three or more kinds of particles differing in the average particle size may be mixed and used.

If the particle diameter of the silica fine particle is too small, the proportion of the void part decreases and reduction of the refractive index cannot be expected, whereas if it is excessively large, fine irregularities are generated on the low refractive index layer surface and the appearance (e.g., dense blackness) or integrated reflectance may be deteriorated. The silica fine particle may be crystalline or amorphous and is preferably a monodisperse particle. The shape is most preferably spherical but even if indefinite form, there arises no problem.

Two or more kinds of hollow silica particles differing in the average particle size may be used in combination. The average particle diameter of the hollow silica can be determined from an electron micrograph.

In the present invention, the specific surface area of the hollow silica is preferably from 20 to 300 $m^2/g$, more preferably from 30 to 120 $m^2/g$, and most preferably from 40 to 90 $m^2/g$. The surface area can be determined by the BET method using nitrogen.

In the present invention, a void-free silica particle may be used in combination with the hollow silica. The particle size of the void-free silica is preferably from 30 to 150 nm, more preferably from 35 to 100 nm, and most preferably from 40 to 80 nm.

[Preparation Method of Porous or Hollow Fine Particle]

A preferred production method of a hollow fine particle is described below. The first stage is the formation of a core particle which can be removed by an after-treatment, the second stage is the formation of a shell layer, the third stage is the dissolution of the core particle, and if desired, the fourth stage is the formation of an additional shell phase. Specifically, the hollow particle can be produced according to the production method of a hollow silica fine particle described, for example, in JP-A-2001-233611.

A preferred production method of the porous particle is a method where in the first stage, a porous core particle is produced by controlling the degree of hydrolysis or condensation of an alkoxide or the kind or amount of the coexisting substance, and in the second stage, a shell layer is formed on the surface of the core particle. Specifically, the porous particle can be produced by the method described, for example, in JP-A-2003-327424, JP-A-2003-335515, JP-A-2003-226516 and JP-A-2003-238140.

In the present invention, the adsorbed water amount of the inorganic fine particle, which is described later, is preferably decreased. The adsorbed water amount can be controlled by changing the particle size or shell thickness or selecting the hydrothermal treatment conditions or the like or may also be decreased by firing the particle.

(Coated Particle)

The adsorbed water amount can be decreased by increasing the shell thickness and thereby decreasing the adsorption site on the particle surface, and this is preferred. Furthermore, when the shell is formed of an electrically conductive component, electrical conductivity can also be advantageously imparted. In particular, a combination using a silica-based porous or hollow particle as the core particle and using $ZnO_2$, $Y_2O_3$, $Sb_2O_5$, ATO, ITO or $SnO_2$ as the shell is preferred. An antimony oxide-coated silica-based fine particle which is particularly preferred, is described below.

In the antimony oxide-coated silica-based fine particle for use in the present invention, a porous silica-based fine particle or a silica-based fine particle having a cavity in the inside is coated with an antimony oxide coat layer. The porous silica-based fine particle includes a porous silica fine particle and a composite oxide fine particle mainly comprising silica, and a low-refractive-index nanometer-size composite oxide fine particle obtained by coating the surface of a porous inorganic oxide fine particle with silica or the like disclosed in JP-A-7-133105 can be suitably used.

As for the silica-based fine particle having a cavity in the inside, a low-refractive-index nanometer-size silica-based fine particle comprising silica and an inorganic oxide other than silica and having a cavity in the inside disclosed in JP-A-2001-233611 can also be suitably used.

The porous silica-based fine particle or silica-based fine particle having a cavity in the inside preferably has an average particle diameter of 4 to 100 nm, more preferably from 10 to 90 nm. When the average particle is 4 nm or more, the silica-based fine particle can be obtained without any problem at the production, the particle obtained is sufficiently stable and there is not caused a trouble such that a monodisperse antimony oxide-coated silica-based fine particle cannot be obtained, which may occur in the case of using a small-size particle. When the average particle diameter is 100 nm or less, this is preferred because the average particle diameter of the obtained antimony oxide-coated silica-based fine particle can be reduced to 120 nm or less and reduction in the transparency or increase of haze, which may occur in the case of forming a transparent film by using a large-size antimony oxide-coated silica-based fine particle, can be suppressed.

The refractive index of the porous silica-based fine particle or silica-based fine particle having a cavity in the inside is preferably not more than 1.45 which is the refractive index of silica, more preferably 1.40 or less. Incidentally, a non-porous silica fine particle having a refractive index of 1.45 to 1.46 may be used alone, but in view of antireflection performance, it is preferred to use a porous silica-based fine particle or a silica-based fine particle having a cavity in the inside.

The silica-based fine particle is preferably coated with antimony oxide such that the average thickness of the coat layer is from 0.5 to 30 nm, preferably from 1 to 10 nm. When the average thickness of the coat layer is 0.5 nm or more, this is preferred because the silica-based fine particle can be completely coated and the obtained antimony oxide-coated silica-based fine particle can exhibit sufficient electrical conductivity. When the thickness of the coat layer is 30 nm or less, this is preferred because a sufficiently high effect of enhancing the electrical conductivity can be obtained and there can be reduced the deficient refractive index which may be encountered in the case where the average particle diameter of the antimony oxide-coated silica-based fine particle is small.

The antimony oxide-coated silica-based fine particle for use in the present invention preferably has an average particle diameter of 5 to 120 nm, more preferably from 10 to 100 nm. When the average particle diameter of the antimony oxide-coated silica-based fine particle is 5 nm or more, this is preferred because the fine particle can be obtained without any problem at the production and aggregation of obtained particles can be suppressed and also because there is not incurred a problem that the transparent film formed using the particle is insufficient in the transparency, haze, film strength, adhesion to substrate, and the like due to poor dispersibility which may be encountered in the case of a small particle. When the average particle diameter of the antimony oxide-coated silica-based fine particle is 120 nm or less, this is preferred because the formed transparent film can have sufficient transparency, the haze can be reduced, and insufficient adhesion to the substrate does not occur.

The refractive index of the antimony oxide-coated silica-based fine particle is preferably from 1.25 to 1.60, more preferably from 1.30 to 1.50. When the refractive index is 1.25 or more, this is preferred because the particle can be obtained without any problem at the production and the strength of the obtained particle can be sufficiently high. On the other hand, when the refractive index is 1.60 or less, the transparent film can exhibit satisfactory antireflection performance and this is preferred.

The volume resistance value of the antimony oxide-coated silica-based fine particle is preferably from 10 to 5,000 Ω/cm, more preferably from 10 to 2,000 Ω/cm. When the volume resistance value is 10 Ω/cm or more, this is preferred because the particle can be obtained without any problem at the production and also because the refractive index of the obtained particle can be 1.6 or less and the transparent film can exhibit satisfactory antireflection performance. On the other hand, when the volume resistance value is 5,000 Ω/cm or less, the transparent film obtained can exert satisfactory antistatic performance and this is preferred. The antimony oxide-coated silica-based fine particle for use in the present invention may be, if desired, surface-treated with a silane coupling agent in a usual manner before use.

[Surface Treatment Method of Inorganic Fine Particle]

The surface treatment method of the inorganic fine particle is described below by referring to a porous or hollow inorganic fine particle. In order to improve the dispersibility in the binder for the formation of a low refractive index layer, the surface of the inorganic fine particle is preferably treated with a hydrolysate of an organosilane and/or a partial condensate thereof, more preferably a hydrolysate of an organosilane represented by the following formula (1) and/or a partial condensate thereof, and it is still more preferred that either one or both of an acid catalyst and a metal chelate compound are used at the treatment.

(Organosilane Compound)

The organosilane compound for use in the present invention is described in detail below.

(R$^{10}$)$_{a1}$—Si(X$^{11}$)$_{4-a1}$   Formula (1):

In formula (1), R$^{10}$ represents a substituted or unsubstituted alkyl group or a substituted or unsubstituted aryl group. Examples of the alkyl group include a methyl group, an ethyl group, a propyl group, an i-propyl group, a hexyl group, a tert-butyl group, an s-butyl group, a hexyl group, a decyl group and a hexadecyl group. The alkyl group is preferably an alkyl group having a carbon number of 1 to 30, more preferably from 1 to 16, still more preferably from 1 to 6. Examples of the aryl group include a phenyl group and a naphthyl group, with a phenyl group being preferred.

X$^{11}$ represents a hydroxyl group or a hydrolyzable group. Examples of the hydrolyzable group include an alkoxy group (preferably an alkoxy group having a carbon number of 1 to 5, such as methoxy group and ethoxy group), a halogen atom (e.g., Cl, Br, I) and a group represented by R$^{12}$COO (wherein R$^{12}$ is preferably a hydrogen atom or an alkyl group having a carbon number of 1 to 5; e.g., CH$_3$COO, C$_2$H$_5$COO). Among these, an alkoxy group is preferred, and a methoxy group and an ethoxy group are more preferred.

a1 represents an integer of 1 to 3 and is preferably 1 or 2, more preferably 1. When a plurality of R$^{10}$'s or X$^{11}$'s are present, the plurality of R$^{10}$'s or X$^{11}$'s may be the same or different.

The substituent contained in R$^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxy-carbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted. Incidentally, in the present invention, even when a single atom is substituted to the hydrogen atom, for the sake of convenience, this is treated as a substituent.

When a plurality of R$^{10}$'s are present, at least one is preferably a substituted alkyl group or a substituted aryl group. Above all, the substituted alkyl group or substituted aryl group preferably further has a vinyl polymerizable group and in this case, the compound represented by formula (1) can be expressed as a vinyl polymerizable substituent-containing organosilane compound represented by the following formula (1-2).

Formula (1-2):

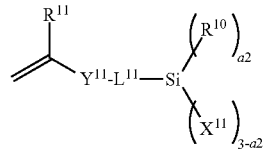

In formula (1-2), R$^{11}$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. R$^{11}$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y$^{11}$ represents a single bond, an ester group, an amido group, an ether group or a urea group and is preferably a single bond, an ester group or an amido group, more preferably a single bond or an ester group, still more preferably an ester group.

L$^{11}$ represents a divalent linking chain and is specifically a substituted or unsubstituted alkylene group, a substituted or unsubstituted arylene group, a substituted or unsubstituted alkylene group having in the inside thereof a linking group (e.g., ether, ester, amido), or a substituted or unsubstituted arylene group having in the inside thereof a linking group, preferably a substituted or unsubstituted alkylene group having a carbon number of 2 to 10, a substituted or unsubstituted arylene group having a carbon number of 6 to 20, or an alkylene group having in the inside thereof a linking group and having a carbon number of 3 to 10, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

a2 represents 0 or 1. When a plurality of $X^{11}$'s are present, the plurality of $X^{11}$'s may be the same or different. a2 is preferably 0.

$R^{10}$ has the same meaning as $R^{10}$ in formula (1) and is preferably a substituted or unsubstituted alkyl group or an unsubstituted aryl group, more preferably an unsubstituted alkyl group or an unsubstituted aryl group. $X^{11}$ also has the same meaning as $X^{11}$ in formula (1) and is preferably a halogen, a hydroxyl group or an unsubstituted alkoxy group, more preferably chlorine, a hydroxyl group or an unsubstituted alkoxy group having a carbon number of 1 to 6, still more preferably a hydroxyl group or an alkoxy having a carbon number of 1 to 3, yet still more preferably a methoxy group.

The organosilane compound for use in the present invention is preferably an organosilane compound represented by the following formula (2).

$$(R_f-L^{21})_{b1}-Si(X^{21})_{b1-4} \quad \text{Formula (2):}$$

In formula (2), $R_f$ represents a linear, branched or cyclic fluorine-containing alkyl group having a carbon number of 1 to 20 or a fluorine-containing aromatic group having a carbon number of 6 to 14. $R_f$ is preferably a linear, branched or cyclic fluoroalkyl group having a carbon number of 3 to 10, more preferably a linear fluoroalkyl group having a carbon number of 4 to 8. $L^{21}$ represents a divalent linking group having a carbon number of 10 or less and is preferably an alkylene group having a carbon number of 1 to 10, more preferably an alkylene group having a carbon number of 1 to 5. The alkylene group is a linear or branched, substituted or unsubstituted alkylene group which may have a linking group (e.g., ether, ester, amido) in the inside. The alkylene group may have a substituent and in this case, preferred examples of the substituent include a halogen atom, a hydroxyl group, a mercapto group, a carboxyl group, an epoxy group, an alkyl group and an aryl group. $X^{21}$ has the same meaning as $X^{11}$ in formula (1) and is preferably a halogen, a hydroxyl group or an unsubstituted alkoxy group, more preferably chlorine, a hydroxyl group or an unsubstituted alkoxy group having a carbon number of 1 to 6, still more preferably a hydroxyl group or an alkoxy group having a carbon number of 1 to 3, yet still more preferably a methoxy group.

b1 has the same meaning as a1 in formula (1) and represents an integer of 1 to 3. b1 is preferably 1 or 2, more preferably 1.

Among the fluorine-containing silane coupling agents represented by formula (2), preferred is a fluorine-containing silane coupling agent represented by the following formula (2-1):

$$C_nF_{2n+1}-(CH_2)_m-Si(X^{22})_3 \quad \text{Formula (2-1):}$$

In formula (2-1), n represents an integer of 1 to 10, and m represents an integer of 1 to 5. n is preferably an integer of 4 to 10, and m is preferably an integer of 1 to 3. $X^{22}$ represents a methoxy group, an ethoxy group or a chlorine atom.

Two or more kinds of the compounds represented by formulae (1), (1-2), (2) and (2-1) may be used in combination.

Specific examples of the compounds represented by formulae (1), (1-2), (2) and (2-1) are set forth below, but the present invention is not limited thereto.

M-1

M-2

M-3

M-4

M-5

M-6

M-7

M-8

M-9

M-10

M-11

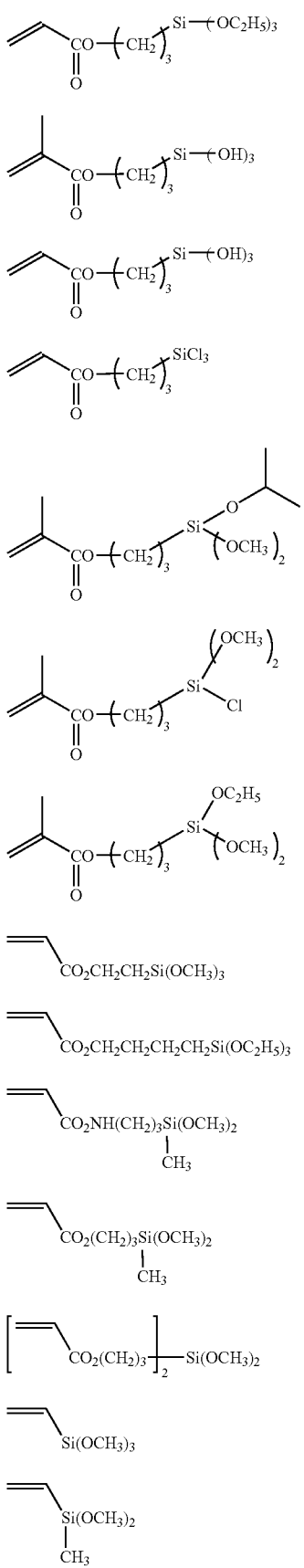
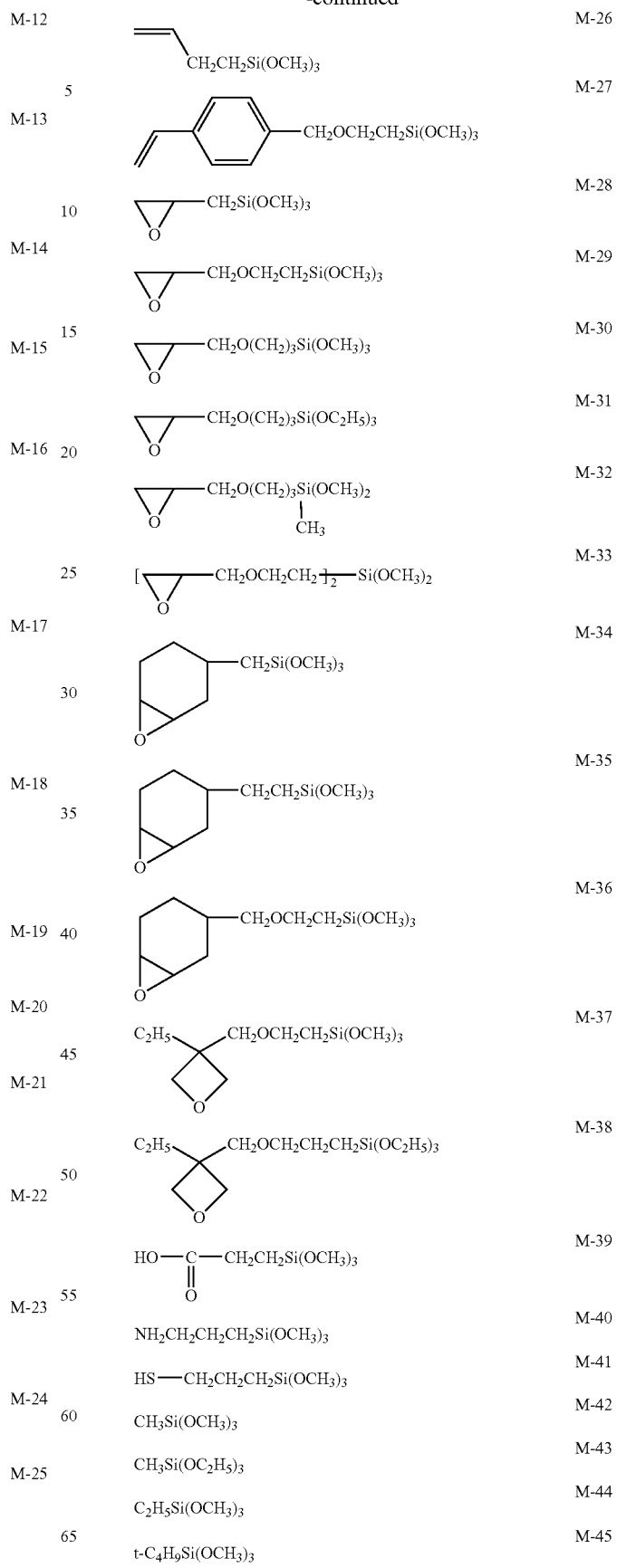

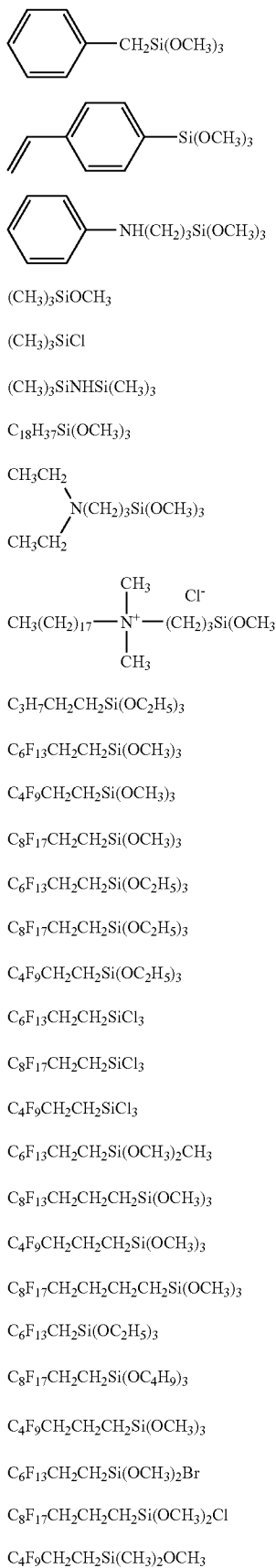

(CH$_3$)$_3$SiOCH$_3$ (CH$_3$)$_3$SiCl (CH$_3$)$_3$SiNHSi(CH$_3$)$_3$

C$_{18}$H$_{37}$Si(OCH$_3$)$_3$

C$_3$H$_7$CH$_2$CH$_2$Si(OC$_2$H$_5$)$_3$

C$_6$F$_{13}$CH$_2$CH$_2$Si(OCH$_3$)$_3$

C$_4$F$_9$CH$_2$CH$_2$Si(OCH$_3$)$_3$

C$_8$F$_{17}$CH$_2$CH$_2$Si(OCH$_3$)$_3$

C$_6$F$_{13}$CH$_2$CH$_2$Si(OC$_2$H$_5$)$_3$

C$_8$F$_{17}$CH$_2$CH$_2$Si(OC$_2$H$_5$)$_3$

C$_4$F$_9$CH$_2$CH$_2$Si(OC$_2$H$_5$)$_3$

C$_6$F$_{13}$CH$_2$CH$_2$SiCl$_3$

C$_8$F$_{17}$CH$_2$CH$_2$SiCl$_3$

C$_4$F$_9$CH$_2$CH$_2$SiCl$_3$

C$_6$F$_{13}$CH$_2$CH$_2$Si(OCH$_3$)$_2$CH$_3$

C$_8$F$_{13}$CH$_2$CH$_2$CH$_2$Si(OCH$_3$)$_3$

C$_4$F$_9$CH$_2$CH$_2$CH$_2$Si(OCH$_3$)$_3$

C$_8$F$_{17}$CH$_2$CH$_2$CH$_2$CH$_2$Si(OCH$_3$)$_3$

C$_6$F$_{13}$CH$_2$Si(OC$_2$H$_5$)$_3$

C$_8$F$_{17}$CH$_2$CH$_2$Si(OC$_4$H$_9$)$_3$

C$_4$F$_9$CH$_2$CH$_2$CH$_2$Si(OCH$_3$)$_3$

C$_6$F$_{13}$CH$_2$CH$_2$Si(OCH$_3$)$_2$Br

C$_8$F$_{17}$CH$_2$CH$_2$Si(OCH$_3$)$_2$Cl

C$_4$F$_9$CH$_2$CH$_2$Si(CH$_3$)$_2$OCH$_3$

M-46 C$_6$F$_{13}$CH$_2$CH$_2$Si(OCH$_3$)Cl$_2$

M-47 (CF$_3$)$_2$CFCF$_2$CF$_2$CH$_2$CH$_2$Si(OCH$_3$)$_3$

M-48 (C$_4$F$_9$)$_2$CFCH$_2$CH$_2$Si(OCH$_3$)$_3$ (C$_6$F$_{13}$)$_2$CFCH$_2$CH$_2$Si(OCH$_3$)$_3$
(CF$_3$)$_3$CCF$_2$CH$_2$CH$_2$Si(OCH$_3$)$_3$

M-49 (C$_4$F$_9$)$_3$CCH$_2$CH$_2$Si(OCH$_3$)$_3$

M-50 (CF$_3$)$_2$CFOCH$_2$CH$_2$CH$_2$Si(OC$_2$H$_5$)$_3$

M-51 (CF$_3$)$_2$CFOCH$_2$CH$_2$CH$_2$SiCl$_3$

M-52 H(CF$_2$)$_6$CH$_2$Si(OCH$_3$)$_3$

M-53 H(CF$_2$)$_4$CH$_2$Si(OCH$_3$)$_3$

H(CF$_2$)$_8$CH$_2$Si(OCH$_3$)$_3$

M-54

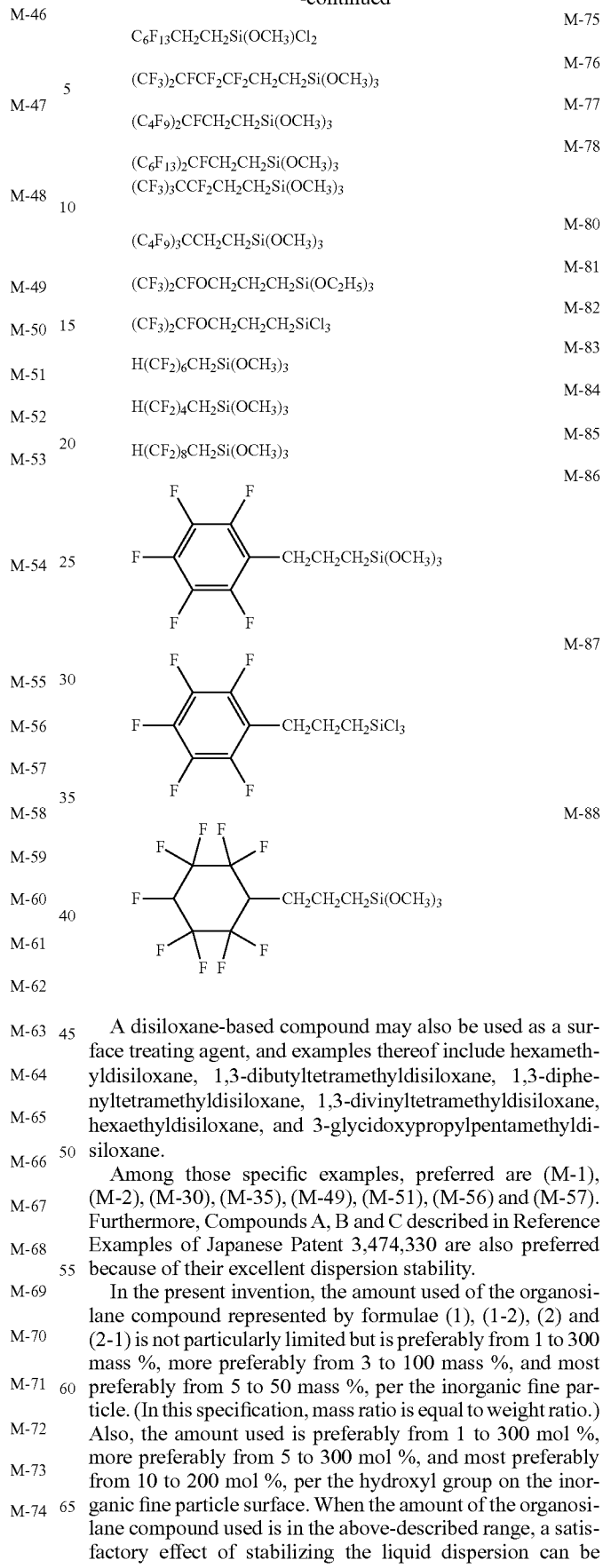

M-55

M-56

M-57

M-58

M-59

M-60

M-61

M-62

M-63

M-64

M-65

M-66

M-67

M-68

M-69

M-70

M-71

M-72

M-73

M-74

M-75

M-76

M-77

M-78

M-80

M-81

M-82

M-83

M-84

M-85

M-86

M-87

M-88

A disiloxane-based compound may also be used as a surface treating agent, and examples thereof include hexamethyldisiloxane, 1,3-dibutyltetramethyldisiloxane, 1,3-diphenyltetramethyldisiloxane, 1,3-divinyltetramethyldisiloxane, hexaethyldisiloxane, and 3-glycidoxypropylpentamethyldisiloxane.

Among those specific examples, preferred are (M-1), (M-2), (M-30), (M-35), (M-49), (M-51), (M-56) and (M-57). Furthermore, Compounds A, B and C described in Reference Examples of Japanese Patent 3,474,330 are also preferred because of their excellent dispersion stability.

In the present invention, the amount used of the organosilane compound represented by formulae (1), (1-2), (2) and (2-1) is not particularly limited but is preferably from 1 to 300 mass %, more preferably from 3 to 100 mass %, and most preferably from 5 to 50 mass %, per the inorganic fine particle. (In this specification, mass ratio is equal to weight ratio.) Also, the amount used is preferably from 1 to 300 mol %, more preferably from 5 to 300 mol %, and most preferably from 10 to 200 mol %, per the hydroxyl group on the inorganic fine particle surface. When the amount of the organosilane compound used is in the above-described range, a satisfactory effect of stabilizing the liquid dispersion can be obtained and the film strength at the formation of a coating film increases. A plurality of organosilane compound species are preferably used in combination, and the plurality of compound species may be added at the same time or may be reacted by adding at different times. Also, when a plurality of compound species are previously formed into a partial condensate and then added, the control of reaction is facilitated and this is preferred.

[Improvement of Dispersibility of Inorganic Fine Particle]

In the present invention, a hydrolysate of the above-described organosilane compound and/or a partial condensate of the hydrolysate is caused to act on the inorganic fine particle surface, whereby the dispersibility of the inorganic fine particle can be improved. The hydrolysis and condensation reaction of the organosilane compound is preferably performed by adding water in an amount of 0.3 to 2.0 mol, preferably from 0.5 to 1.0 mol, per mol of the hydrolyzable group ($X^{11}$, $X^{21}$ or $X^{22}$) and stirring the system at 15 to 100° C. in the presence of an acid catalyst or metal chelate compound for use in the present invention.

[Catalyst for Dispersibility Improving Treatment]

The dispersibility improving treatment with a hydrolysate of organosilane and/or a condensation reaction product thereof is preferably performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; and metal alkoxides such as triisopropoxyaluminum and tetrabutoxyzirconium. In view of the production stability or storage stability of the inorganic oxide fine particle solution, an acid catalyst (inorganic acids, organic acids) and/or a metal chelate compound are used in the present invention. As for the inorganic acid, a hydrochloric acid and a sulfuric acid are preferred, and as for the organic acid, an organic acid having an acid dissociation constant (pKa value (at 25° C.)) of 4.5 or less in water is preferred. Above all, a hydrochloric acid, a sulfuric acid and an organic acid having an acid dissociation constant of 3.0 or less in water are more preferred, a hydrochloric acid, a sulfuric acid and an organic acid having an acid dissociation constant of 2.5 or less in water are still more preferred, and an organic acid having an acid dissociation constant of 2.5 or less in water is yet still more preferred. Among these, a methanesulfonic acid, an oxalic acid, a phthalic acid and a malonic acid are more preferred, and an oxalic acid is still more preferred.

In the case where the hydrolyzable group of the organosilane is an alkoxy group and the acid catalyst is an organic acid, the carboxyl group or sulfo group of the organic acid supplies a proton and therefore, the amount of water added can be decreased. The amount of water added is from 0 to 2 mol, preferably from 0 to 1.5 mol, more preferably from 0 to 1 mol, still more preferably from 0 to 0.5 mol, per mol of the alkoxide group of organosilane. In the case of using an alcohol as the solvent, an embodiment of adding substantially no water is also preferred.

(Metal Chelate Compound)

In the present invention, the metal chelate compound used for the dispersibility improving treatment with a hydrolysate of organosilane and/or a condensation reaction product thereof is preferably at least one metal chelate compound where an alcohol represented by the following formula (3-1) and a compound represented by the following formula (3-2) are present as ligands and the center metal is a metal selected from Zr, Ti and Al. As long as the center metal is a metal selected from Zr, Ti and Al, the metal chelate compound can be suitably used without any particular limitation. Within this category, two or more kinds of metal chelate compounds may be used in combination.

$R^{31}OH$           Formula (3-1):

$R^{32}COCH_2COR^{33}$       Formula (3-2):

(wherein $R^{31}$ and $R^{32}$, which may be the same or different, each represents an alkyl group having a carbon number of 1 to 10, and $R^{33}$ represents an alkyl group having a carbon number of 1 to 10 or an alkoxy group having a carbon number of 1 to 10).

Specific examples of the metal chelate compound suitably used in the present invention include a zirconium chelate compound such as tri-n-butoxyethylacetoacetate zirconium, di-n-butoxybis(ethylacetoacetate)zirconium, n-butoxytris(ethylacetoacetate)zirconium, tetrakis(n-propylacetoacetate)zirconium, tetrakis(acetylacetoacetate)zirconium and tetrakis(ethylacetoacetate)zirconium; a titanium chelate compound such as diisopropoxy.bis(ethylacetoacetate)titanium, diisopropoxy.bis(acetylacetate)titanium and diisopropoxy.bis(acetylacetone)titanium; and an aluminum chelate compound such as diisopropoxyethylacetoacetate aluminum, diisopropoxyacetylacetonate aluminum, isopropoxybis(ethylacetoacetate)aluminum, isopropoxybis(acetylacetonate)aluminum, tris(ethylacetoacetate)aluminum, tris(acetylacetonate)aluminum and monoacetylacetonato.bis(ethylacetoacetate)aluminum.

Among these metal chelate compounds, preferred are tri-n-butoxyethylacetoacetate zirconium, diisopropoxy.bis(acetylacetonate)titanium, diisopropoxyethylacetoacetate aluminum and tris(ethylacetoacetate)aluminum. One kind of these metal chelate compounds may be used alone, or two or more kinds thereof may be mixed and used. Furthermore, a partial hydrolysate of such a metal chelate compound may also be used. The amount of the metal chelate compound is preferably from 0.1 to 10.0 mass %, more preferably from 0.5 to 5.0 mass %, and most preferably from 1.0 to 3.0 mass %, based on the organosilane compound.

[Component (B) Constituting Low Refractive Index Layer of the Present Invention]

(Fluorine-Containing Copolymer)

Out of the binders of the polymer for use in the present invention, a fluorine-containing copolymer compound is used particularly for the low refractive index layer. The terms "(meth)acrylate", "(meth)acrylic acid" and "(meth)acryloyl" as used in the present invention indicate "acrylate or methacrylate", "acrylic acid or methacrylic acid" and "acryloyl or methacryloyl", respectively.

Examples of the fluorine-containing vinyl monomer include fluoroolefins (e.g., fluoroethylene, vinylidene fluoride, tetrafluoroethylene, hexafluoropropylene), partially or completely fluorinated alkyl ester derivatives of (meth)acrylic acid (e.g., VISCOAT 6FM (trade name, produced by Osaka Organic Chemical Industry Ltd.), R-2020 (trade name, produced by Daikin Industries, Ltd.), and completely or partially fluorinated vinyl ethers. Among these, perfluoroolefins are preferred, and in view of refractive index, solubility, transparency, availability and the like, hexafluoropropylene is more preferred. When the compositional ratio of the fluorine-containing vinyl monomer is increased, the refractive index may be lowered but the film strength decreases. In the present invention, the fluorine-containing vinyl monomer is preferably introduced such that the copolymer has a fluorine content of 20 to 60 mass %, more preferably from 25 to 55 mass %, still more preferably from 30 to 50 mass %.

A copolymer of a unit derived from the above-described fluorine-containing vinyl monomer with a unit represented by the following (1), (2) or (3) for imparting crosslinking reactivity can be preferably utilized.

(1): A constitutional unit obtained by the polymerization of a monomer previously having a self-crosslinking functional group within the molecule, such as glycidyl (meth)acrylate and glycidyl vinyl ether.

(2): A constitutional unit obtained by the polymerization of a monomer having a carboxyl group, a hydroxy group, an amino group, a sulfo group or the like (such as (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid).

(3): A constitutional unit obtained, for example, by reacting a compound having a group capable of reacting with the functional group of (1) or (2) above and another crosslinking functional group in the molecule, and the constitutional unit of (1) or (2) above (for example, a constitutional unit which can be synthesized by a method of causing an acrylic acid chloride to act on a hydroxyl group).

In the constitutional unit of (3), the crosslinking functional group is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an o-phenylmaleimide group, a phenyl-azide group, a sulfonylazide group, a carbonylazide group, a diazo group, an o-quinonediazide group, a fuylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. Not only one of these groups but also two or more kinds thereof may be contained. Among these, a (meth)acryloyl group and a cinnamoyl group are preferred, and a (meth)acryloyl group is more preferred.

The specific method for preparing the photopolymerizable group-containing copolymer includes, but is not limited to, the following methods:

a. a method of performing esterification by reacting a (meth)acrylic acid chloride with a crosslinking functional group-containing copolymer having a hydroxyl group, b. a method of performing urethanization by reacting an isocyanate group-containing (meth)acrylic acid ester with a crosslinking functional group-containing copolymer having a hydroxyl group, c. a method of performing esterification by reacting a (meth)acrylic acid with a crosslinking functional group-containing copolymer having an epoxy group, and d. a method of performing esterification by reacting an epoxy group-containing (meth)acrylic acid ester with a crosslinking functional group-containing copolymer having a carboxyl group.

The amount of the photopolymerizable group introduced can be arbitrarily adjusted and, for example, from the standpoint of stabilizing the coating surface state, reducing the surface state failure when an inorganic particle is present together, or enhancing the film strength, it is also preferred to leave a given amount of a carboxyl group, a hydroxyl group or the like.

In the copolymer useful for the present invention, in addition to the repeating unit derived from the fluorine-containing vinyl monomer and the repeating unit having a (meth)acryloyl group in the side chain, other vinyl monomers may be appropriately copolymerized from various viewpoints such as adhesion to substrate, Tg (contributing to film hardness) of polymer, solubility in solvent, transparency, slipperiness, dust protection and antifouling property. A plurality of these vinyl monomers may be combined according to the purpose, and these monomers are preferably introduced in a total amount of 0 to 65 mol %, more preferably from 0 to 40 mol %, still more preferably from 0 to 30 mol %, based on the copolymer.

The vinyl monomer unit which can be used in combination is not particularly limited, and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate, 2-hydroxyethyl acrylate), methacrylic acid esters (e.g., methyl methacrylate, ethyl methacrylate, butyl methacrylate, 2-hydroxyethyl methacrylate), styrene derivatives (e.g., styrene, p-hydroxymethylstyrene, p-methoxystyrene), vinyl ethers (e.g., methyl vinyl ether, ethyl vinyl ether, cyclohexyl vinyl ether, hydroxyethyl vinyl ether, hydroxybutyl vinyl ether), vinyl esters (e.g., vinyl acetate, vinyl propionate, vinyl cinnamate), unsaturated carboxylic acids (e.g., acrylic acid, methacrylic acid, crotonic acid, maleic acid, itaconic acid), acrylamides (e.g., N,N-dimethylacrylamide, N-tert-butylacrylamide, N-cyclohexylacrylamide), methacrylamides (e.g., N,N-dimethylmethaerylamide), and acrylonitrile.

The fluorine-containing polymer particularly useful for the present invention is a random copolymer of perfluoroolefin with vinyl ethers or vinyl esters. In particular, the fluorine-containing polymer preferably has a group capable of undergoing a crosslinking reaction by itself (for example, a radical reactive group such as (meth)acryloyl group, or a ring-opening polymerizable group such as epoxy group and oxetanyl group). The crosslinking reactive group-containing polymerization unit preferably occupies from 5 to 70 mol %, more preferably from 30 to 60 mol %, in all polymerization units of the polymer. Preferred examples of the polymer include those described in JP-A-2002-243907, JP-A-2002-372601, JP-A-2003-26732, JP-A-2003-222702, JP-A-2003-294911, JP-A-2003-329804, JP-A-2004-4444 and JP-A-2004-45462.

For the purpose of imparting antifouling property, a polysiloxane structure is preferably introduced into the fluorine-containing polymer for use in the present invention. The method for introducing a polysiloxane structure is not limited, but preferred examples thereof include a method of introducing a polysiloxane block copolymerization component by using a silicone macroazo initiator described in JP-A-6-93100, JP-A-11-189621, JP-A-11-228631 and JP-A-2000-313709; and a method of introducing a polysiloxane graft copolymerization component by using a silicone macromer described in JP-A-2-251555 and JP-A-2-308806. Particularly preferred compounds include the polymers in Examples 1, 2 and 3 of JP-A-11-189621, and Copolymers A-2 and A-3 of JP-A-2-251555. The content of the polysiloxane component in the polymer is preferably from 0.5 to 10 mass %, more preferably from 1 to 5 mass %.

The molecular weight of the polymer which can be preferably used in the present invention is, in terms of the mass average molecular weight, preferably 5,000 or more, more preferably from 10,000 to 500,000, and most preferably from 15,000 to 200,000. Also, the coating surface state or scratch resistance may be improved by using polymers differing in the average molecular weight in combination.

In combination with the above-described polymer, a curing agent having a polymerizable unsaturated group may be appropriately used as described in JP-A-10-25388 and JP-A-2000-17028. Examples of the compound having a polyfunctional polymerizable unsaturated group include compounds described later regarding a non-fluorine-containing polyfunctional monomer. Of these compounds, a compound having a polymerizable unsaturated group in the polymer main body is preferred, because a great combinational effect of improving the scratch resistance is provided.

[Component (C) Constituting Low Refractive Index Layer of the Present Invention]

(Polyfunctional Fluorine-Containing Acrylate)

In the present invention, (C) a polyfunctional fluorine-containing acrylate represented by the following structural formula is used as a constituent component of the low refractive index layer.

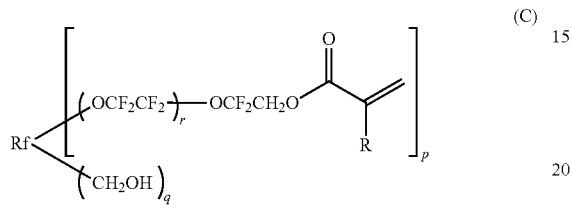

(C)

In the formula above, Rf represents a (p+q)-valent perfluoro saturated hydrocarbon group which may have an ether bond, p represents an integer of 2 to 10, q represents an integer of 0 to 8, provided that (p+q) represents an integer of 2 to 10, and r represents an integer of 0 to 100.

Rf may be either linear or branched or may have a ring structure. The carbon umber of Rf is preferably 1 to 20, more preferably 1 to 10. Preferred examples of Rf are set forth below, but the present invention is not limited thereto.

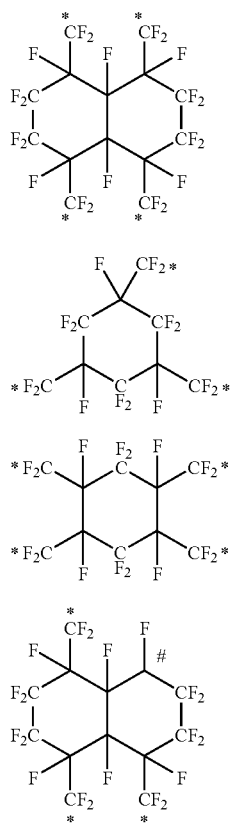

Rf-1

Rf-2

Rf-3

Rf-4

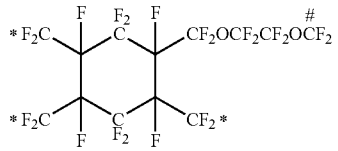

Rf-5

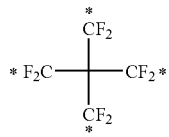

Rf-6

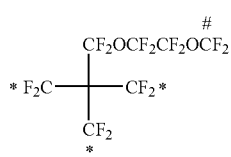

Rf-7

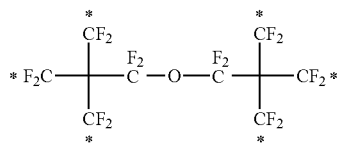

Rf-8

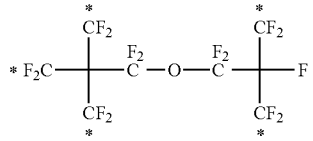

Rf-9

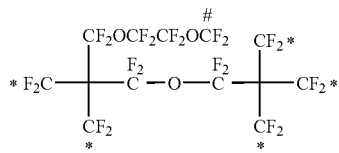

Rf-10

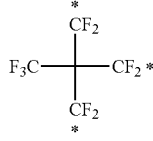

Rf-11

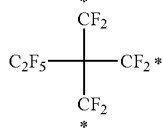

Rf-12

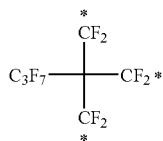

Rf-13

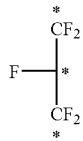

Rf-14

-continued

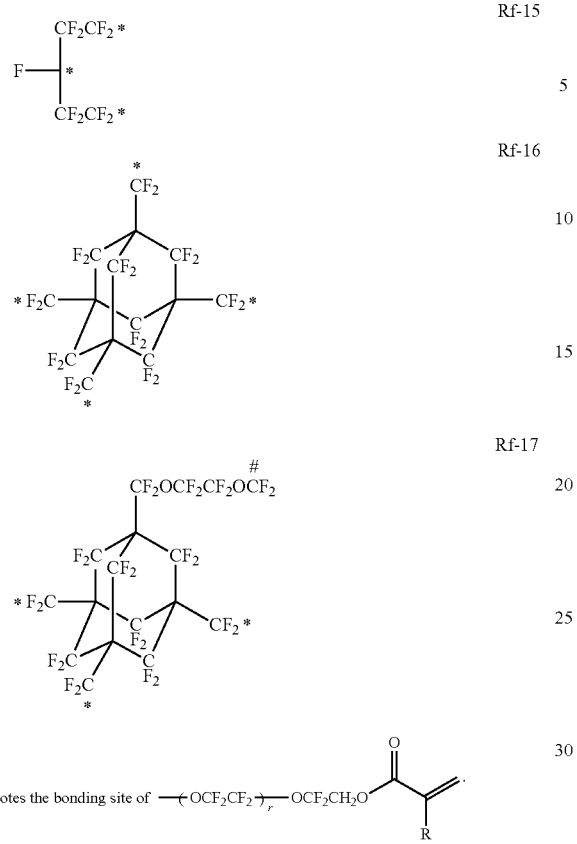

Rf-15

Rf-16

Rf-17

\* denotes the bonding site of —(OCF$_2$CF$_2$)$_r$—OCF$_2$CH$_2$O—C(=O)—C(R)=CH$_2$.

\# denotes the bonding site of —CH$_2$OH.

p is preferably an integer of 3 to 6 and at this time, q is preferably an integer of 0 to 3, provided that (p+q) is an integer of 3 to 6.
r represents an integer of 0 to 100 and is preferably an integer of 0 to 50, more preferably from 0 to 20, still more preferably from 0 to 10, yet still more preferably from 0 to 4, and most preferably 0 to 1.

The polyfunctional fluorine-containing acrylate (C) for use in the present invention contains p linking groups represented by —(OCF$_2$CF$_2$)$_r$—OCF$_2$CH$_2$O within one molecular, and r's in one molecule may be the same or different. This compound is presumed to have an action of improving the dispersibility of inorganic fine particle and the scratch resistance while maintaining the low refractive index. In particular, r is preferably 4 or less because a high crosslinking group density is obtained and the strength of the coating film is increased. If r exceeds 100, the crosslinking group density of the coating film decreases and this incurs worsening of the scratch resistance.

R represents a hydrogen atom, a methyl group, a fluorine atom or a trifluoromethyl group and is preferably a hydrogen atom.

As regards the polyfunctional fluorine-containing acrylate (C) for use in the present invention, a single kind of a compound or two or more kinds of compounds may be used. Specific examples of the polyfunctional fluorine-containing acrylate (C) for use in the present invention are set forth below. Here, those where r=1 are shown as typical examples, but the present invention is not limited thereto in terms of the skeleton (Rf) and r.

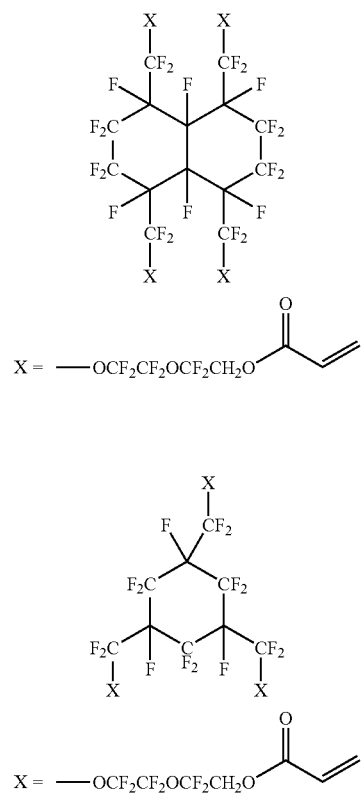

(C-1)

X = —OCF$_2$CF$_2$OCF$_2$CH$_2$O—C(=O)—CH=CH$_2$ (C-2)

X = —OCF$_2$CF$_2$OCF$_2$CH$_2$O—C(=O)—CH=CH$_2$

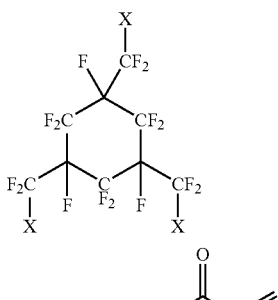

(C-3)

X = —OCF$_2$CF$_2$OCF$_2$CH$_2$O—C(=O)—C(CH$_3$)=CH$_2$

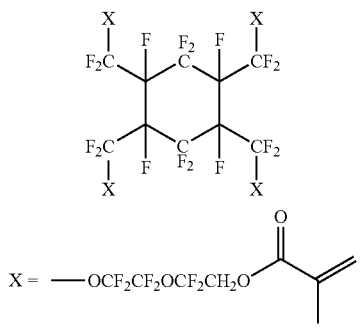

(C-4)

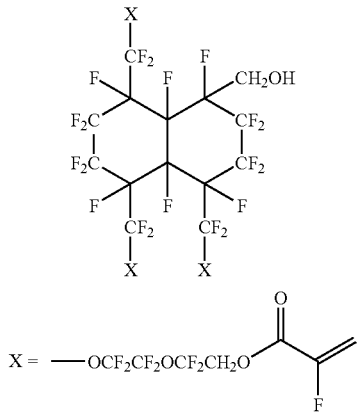

X = —OCF$_2$CF$_2$OCF$_2$CH$_2$O—C(=O)—CF=CH$_2$

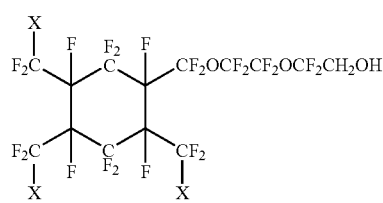 (C-5)
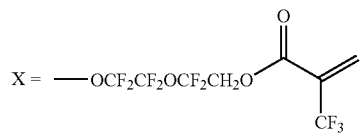
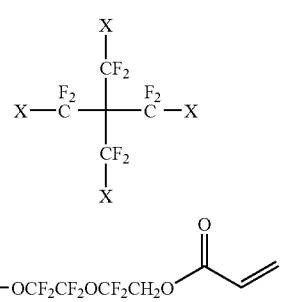 (C-6)
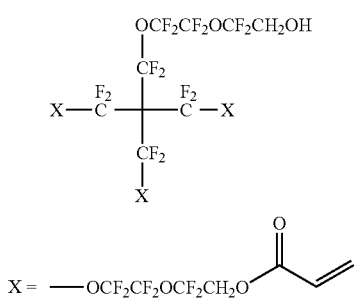 (C-7)
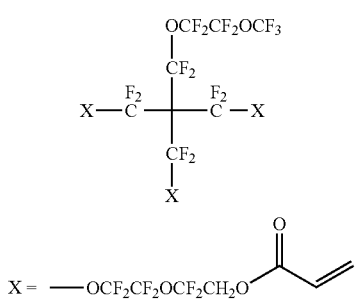 (C-8)
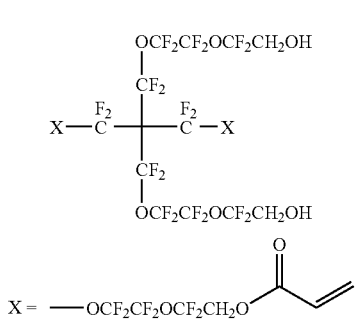 (C-9)
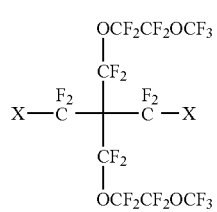 (C-10)
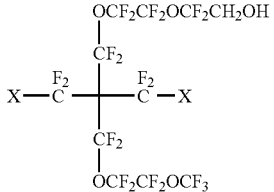 (C-11)
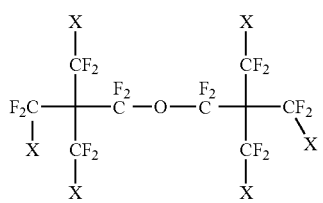
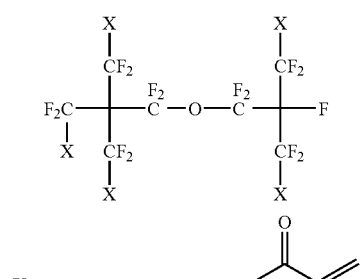 (C-12)
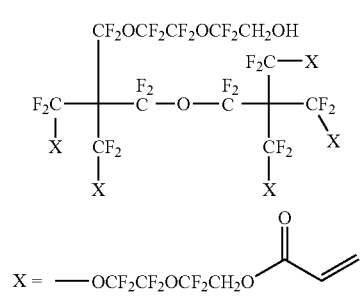 (C-13)
(C-14)

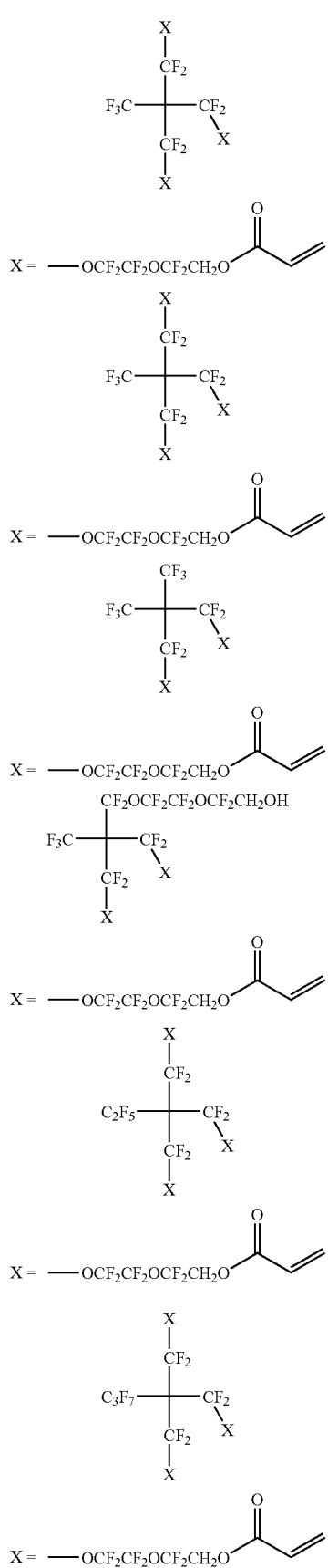
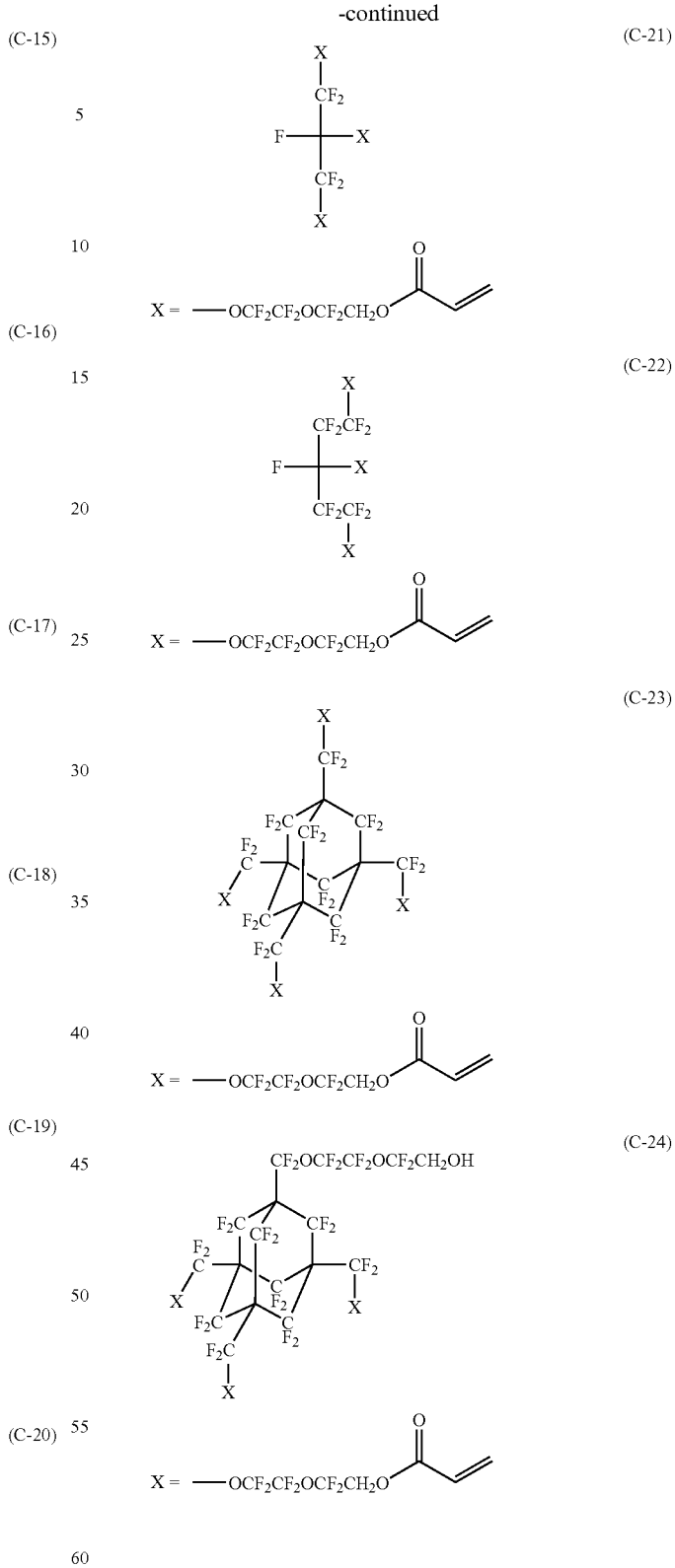
The polyfunctional fluorine-containing acrylate (C) for use in the present invention can be easily synthesized by utilizing the liquid-phase fluorination reaction described in WO90/03353 o WO00/56694. A synthesis example of Compound (C-6) is specifically described below.

Synthesis Example of (C-6):
Compound (C-6) was synthesized by the following route.

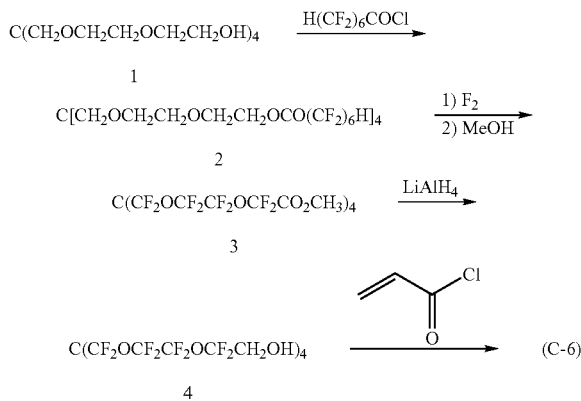

Synthesis of Compound 2:
While keeping the temperature at 20° C. or less, 7H-dodecafluoropentanoyl chloride (321 g, 0.88 mol) was added dropwise to an ethyl acetate (1.5 L) solution containing pyridine (77.6 ml, 0.96 mol) and Compound 1 (97.7 g, 0.2 mol) synthesized by a method known in publications (for example, Eur. J. Ord. Chem., 485-490 (2000)). After the dropwise addition, the reaction solution was stirred at room temperature for 6 hours, and insoluble matters were removed by filtration. The filtrate was washed twice with sodium bicarbonate water (1.5 L) and further twice with saturated brine (1.5 L). The organic layer was dried over magnesium sulfate and concentrated under reduced pressure. The concentrate was purified by column chromatography (developing solvent: ethyl acetate/hexane=⅓) to obtain Compound 2 (306 g, 0.17 mol).

Synthesis of Compound 3:
Into a 1,000 ml-volume Teflon-made reaction vessel, sodium fluoride (54.2 g, 1.29 mol) and perfluorohexane (700 ml) were charged and kept at −10° C. At the outlet of the reaction vessel, a refluxing device kept at −50° C. or less was disposed. A nitrogen gas was blown into the reaction vessel at a rate of 200 ml/min for 1 hour and then, a fluorine gas diluted with nitrogen gas to 20% (hereinafter simply referred to as a fluorine gas) was blown thereinto at a rate of 250 ml/min for 30 minutes. While blowing a fluorine gas at the same rate, a mixed solution of Compound 2 (30 g, 16.7 mol) and hexafluorobenzene (5 g, 26.9 mol) was added over 5 hours and furthermore, while blowing a fluorine gas at the same rate, a perfluorohexane (10 ml) solution of hexafluorobenzene (2.0 g) was added over 1 hour and 30 minutes. A fluorine gas was further blown into the reaction vessel at a rate of 250 ml/min for 30 minutes, and a nitrogen gas was then blown at a rate of 200 ml/min for 1 hour. Subsequently, 100 ml of ethanol was added to the reaction solution and the resulting solution was stirred at room temperature for 1 hour. After removing insoluble matters by filtration, the filtrate was concentrated under reduced pressure and low-boiling-point components were further removed by a vacuum pump (room temperature, 2 mmHg) to obtain 16.5 g of a concentrate. This concentrate was confined by NMR to be a mixture mainly comprising Compound 3 and without performing purification any more, used in the next step.

Synthesis of Compound 4:
A diethyl ether (100 ml) solution of the concentrate above (16.5 g) was added dropwise to a diethyl ether (450 ml) liquid dispersion of lithium aluminum hydride (5.43 g, 0.143 mol) at 5° C. in a nitrogen atmosphere. After stirring the reaction solution at room temperature for 5 hours, ice water (700 g) was slowly added with care not to cause bubbling and hydrochloric acid (48 ml) was further added dropwise. Insoluble matters were removed by Celite filtration and then, liquid separation was performed. The organic layer was washed with water and then with saturated brine (400 ml) and dried over magnesium sulfate. This organic layer was concentrated under reduced pressure and further purified by column chromatography (developing solvent: dichloromethane/ethanol=10/1) to obtain Compound 4 (9.1 g, 8.56 mmol).

Synthesis of Compound (C-6):
Acrylic acid chloride (7.2 g, 79.5 mmol) was added dropwise to an acetonitrile (400 ml) liquid dispersion of Compound 4 (9.1 g, 8.56 mmol) and potassium carbonate (32.9 g, 0.238 mol) at room temperature. The reaction solution was stirred at room temperature for 4 hours and then slowly charged into ethyl acetate (1 L)/1N aqueous hydrochloric acid (1 L). The organic layer was washed once with each of sodium bicarbonate water, water and saturated brine and dried over magnesium sulfate. The resulting organic layer was concentrated under reduced pressure and purified by column chromatography (developing solvent: ethyl acetate/hexane=⅕) to obtain Compound (C-6) (8.5 g, 6.64 mmol).

[Component (D) Non-Fluorine-containing Polyfunctional Monomer]

In the present invention, for the fluorine-containing polymer, a non-fluorine-containing polyfunctional monomer may be appropriately used in combination as a curing agent. The non-fluorine-containing polyfunctional monomer provides a great combinational effect of improving the scratch resistance particularly when a polymerizable unsaturated group-containing compound is used in the polymer main body, and this is preferred.

The non-fluorine-containing polyfunctional monomer for use in the present invention is described below. The monomer includes a compound having a polymerizable functional group such as (meth)acryloyl group, vinyl group, styryl group and allyl group. Among these, a (meth)acryloyl group is preferred. Above all, a compound containing two or more (meth)acryloyl groups within one molecule may be preferably used. Such a compound provides a great combinational effect of improving the scratch resistance particularly when a polymerizable unsaturated group-containing compound is used in the polymer main body, or improving the scratch resistance after a chemical treatment, and this is preferred.

Specific examples of the non-fluorine-containing polyfunctional monomer include:
(meth)acrylic acid diesters of alkylene glycol, such as neopentyl glycol acrylate, 1,6-hexanediol (meth)acrylate and propylene glycol di(meth)acrylate;
(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;
(meth)acrylic acid diesters of polyhydric alcohol, such as pentaerythritol di(meth)acrylate; and
(meth)acrylic acid diesters of ethylene oxide or propylene oxide adduct, such as 2,2-bis{4-(acryloxy.diethoxy)phenyl}propane and 2-2-bis{4-(acryloxy.poly-propoxy)phenyl}propane.

Furthermore, epoxy (meth)acrylates, urethane (meth)acrylates and polyester (meth)acrylates may also be preferably used as the photopolymerizable polyfunctional monomer.

Above all, esters of polyhydric alcohol and (meth)acrylic acid are preferred, and a polyfunctional monomer having three or more (meth)acryloyl groups within one molecule is more preferred. Examples thereof include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri (meth)acrylate, EO-modified phosphoric acid tri(meth) acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl)isocyanurate.

Specific examples of the polyfunctional acrylate-based compounds having a (meth)acryloyl group include an esterified product of polyol and (meth)acrylic acid, such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60 and KAYARAD GPO-303 produced by Nippon Kayaku Co., Ltd.; and V#3PA, V#400, V#36095D, V#1000 and V#1080 produced by Osaka Organic Chemical Industry Ltd. Other examples of the polyfunctional acrylate-based compound which can be suitably used include a trifunctional or greater functional urethane acrylate compound such as Shiko UV-1400B, Shiko UV-1700B, Shiko UV-6300B, Shiko UV-7550B, Shiko UV-7600B, Shiko UV-7605B, Shiko UV-7610B, Shiko UV-7620EA, Shiko UV-7630, Shiko UV-7640B, Shiko UV-6630B, Shiko UV-7000B, Shiko UV-7510B, Shiko UV-7461TE, Shiko UV-3000B, Shiko UV-3200B, Shiko UV-3210EA, Shiko UV-3310EA, Shiko UV-3310B, Shiko UV-3500BA, Shiko UV-3520TL, Shiko UV-3700B, Shiko UV-6100B, Shiko UV-6640B, Shiko UV-2000Bf, Shiko UV-2010B, Shiko UV-2250EA and Shiko UV-2750B (produced by The Nippon Synthetic Chemical Industry Co., Ltd.), UL-503LN (produced by Kyoeisha Chemical Co., Ltd.), UNIDIC 17-806, UNIDIC 17-813, UNIDIC V-4030 and UNIDIC V-4000BA (produced by Dainippon Ink and Chemicals, Inc.), EB-1290K, EB-220, EB-5129, EB-1830 and EB-4858 (produced by Daicel-UCB Company Ltd.), Hi-Coap AU-2010 and Hi-Coap AU-2020 (produced by Tokushiki Co., Ltd.), ARONIX M-1960 (produced by Toagosei Co., Ltd.), and Art Resin UN-3320HA, UN-3320HC, UN-3320HS, UN-904 and HDP-4T; and a trifunctional or greater functional polyester compound such as ARONIX M-8100, M-8030 and M-9050 (produced by Toagosei Co., Ltd.), and KRM-8307 (produced by DAICEL-CYTEC Company Ltd.).

Still other examples include a resin having three or more (meth)acryloyl groups, such as relatively low molecular weight polyester resin, polyether resin, acrylic resin, epoxy resin, urethane resin, alkyd resin, spiroacetal resin, polybutadiene resin and polythiolpolyene resin, and an oligomer or prepolymer of a polyfunctional compound (e.g., polyhydric alcohol).

As for the monomer binder, a dendrimer described, for example, in JP-A-2005-76005 and JP-A-2005-36105, or a norbornene ring-containing monomer described, for example, in JP-A-2005-60425 may also be used.

Two or more kinds of polyfunctional monomers may be used in combination. The polymerization of such a monomer having an ethylenically unsaturated group may be performed by the irradiation of ionizing radiation or under heating, in the presence of a photoradical initiator or a thermal radical initiator.

In the polymerization reaction of the photopolymerizable polyfunctional monomer, a photopolymerization initiator is preferably used, and the photopolymerization initiator is preferably a photoradical polymerization initiator or a photocationic polymerization initiator, more preferably a photoradical polymerization initiator.

In the present invention, at least one kind of a polysiloxane-based compound is preferably contained.

[Component (E) Polysiloxane-Based Compound]

The polysiloxane-based compound is described below. In the present invention, a compound having a polysiloxane structure can be used for the purpose of imparting slipperiness to enhance the scratch resistance and imparting antifouling property. The compound is not limited in its structure and includes those having a substituent at the terminal and/or in the side chain of the compound chain containing a plurality of dimethylsilyloxy units as a repeating unit. In the compound chain containing dimethylsilyloxy as a repeating unit, a structural unit other than dimethylsilyloxy may be contained.

In the case of adding such a compound, the compound is preferably added in the range from 0.01 to 20 mass %, more preferably from 0.05 to 10 mass %, still more preferably from 0.1 to 5 mass %, based on the entire solid content of the low refractive index layer.

The molecular weight of the compound having a polysiloxane structure is not particularly limited but is preferably 100,000 or less, more preferably 50,000 or less, and most preferably from 3,000 to 30,000.

From the standpoint of preventing transfer, the compound preferably contains a (meth)acryloyl group or a functional group that reacts with a (meth)acryloyl group to form a bond. This bond-forming reaction preferably proceeds swiftly in the presence of a polymerization initiator. Preferred examples of the compound include, but are not limited to, the followings.

Preferred examples of the compound include those having a substituent at the terminal and/or in the side chain of the compound chain containing a plurality of dimethylsilyloxy units as a repeating unit. In the compound chain containing dimethylsilyloxy as a repeating unit, a structural unit other than dimethylsilyloxy may be contained. A plurality of substituents, which may be the same or different, are preferably present. Preferred examples of the substituent include a group containing an acryloyl group, a methacryloyl group, a vinyl group, an aryl group, a cinnamoyl group, an oxetanyl group, a fluoroalkyl group, a polyoxyalkylene group, a carboxyl group or an amino group. It is particularly preferred to contain a (meth)acryloyl group. The molecular weight is not particularly limited but is preferably 100,000 or less, more preferably 50,000 or less, still more preferably from 3,000 to 30,000, and most preferably from 10,000 to 20,000. The silicone atom content of the silicone-based compound is not particularly limited but is preferably 18.0 mass % or more, more preferably from 25.0 to 37.0 mass %, and most preferably from 30.0 to 37.0 mass %. Preferred examples of the silicone-based compound include, but are not limited to, X-22-174DX, X-22-2426, X-22-164B, X22-164C and X-22-1821 (all trade names) produced by Shin-Etsu Chemical Co., Ltd.; FM-0725, FM-7725, FM-6621 and FM-1121 produced by Chisso Corporation; and DMS-U22, RMS-033, RMS-083, UMS-182, DMS-H21, DMS-H31, HMS-301, FMS121, FMS123, FMS131, FMS141 and FMS221 (all trade names) produced by Gelest.

For the purpose of imparting properties such as dust protection and antistatic property, a dust inhibitor, an antistatic agent and the like such as known cationic surfactant and polyoxyalkylene-based compound may be appropriately added. A structural unit of such a dust inhibitor or antistatic agent may be contained as a part of the function in the above-described silicone-based compound. In the case of adding such an additive, the additive is preferably added in the range from 0.01 to 20 mass %, more preferably from 0.05 to 10 mass %, still more preferably from 0.1 to 5 mass %, based on the entire solid content of the lower refractive index layer. Preferred examples of the compound include, but are not limited to, SH-3748 (trade name) produced by Dow Corning Toray Co., Ltd.

(Polymerization Initiator)

The polymerization initiator effective for curing the low refractive index layer of the present invention is described below. In the case where the constituent component of the low refractive index layer is a radical polymerizable compound, the polymerization of such a compound may be performed by the irradiation of ionizing radiation or under heating in the presence of a photoradical initiator or a thermal radical initiator.

(Photoradical Initiator)

Examples of the photoradical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes and coumarins.

Examples of the acetophenones include 2,2-dimethoxyacetophenone, 2,2-diethoxyacetopbenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-tert-butyl-dichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether and benzoin isopropyl ether.

Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone) and 3,3',4,4'-tetra(tert-butylperoxycarbonyl)benzophenone.

Examples of the phosphine oxides include 2,4,6-trimethylbenzoyldiphenylphosphine oxide. Examples of the active esters include 1,2-octanedione, 1-[4-(phenylthio)-2-(O-benzoyloxime)], sulfonic acid esters and cyclic active ester compounds. Specifically, Compounds 1 to 21 described in Examples of JP-A-2000-80068 are preferred.

Examples of the onium salts include an aromatic diazonium salt, an aromatic iodonium salt and an aromatic sulfonium salt. Examples of the borate salts include ion complexes with a cationic coloring matter.

The active halogens specifically include compounds described, for example, in Wakabayashi et al., Bull Chem. Soc. Japan, Vol. 42, page 2924 (1969), U.S. Pat. No. 3,905,815, JP-A-5-27830, and M. P. Hutt, Journal of Heterocyclic Chemistry, Vol. 1 (No. 3), (1970), particularly an oxazole compound substituted by a trihalomethyl group, and an s-triazine compound. An s-triazine derivative in which at least one mono-, di- or tri-halogen-substituted methyl group is bonded to the s-triazine ring, is more suitable. Specifically, S-triazine and oxathiazole compounds are known, and examples thereof include 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl-4,6-bis(trichloromethyl)-s-triazine and 2-trihalomethyl-5-(p-methoxyphenyl)-1,3,4-oxadiazole. Specific preferred examples thereof include compounds described at pp. 14-30 of JP-A-58-15503 and pp. 6-10 of JP-A-55-77742, compound Nos. 1 to 8 described at page 287 of JP-B-60-27673 (the term "JP-B" as used herein means an "examined Japanese patent publication"), compound Nos. 1 to 17 described at pp. 443-444 of JP-A-60-239736, and compound Nos. 1 to 19 described in U.S. Pat. No. 4,701,399.

Specific examples of the active halogens are as follows.

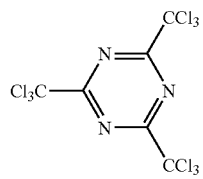

1

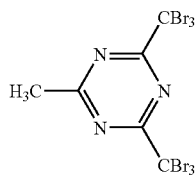

2

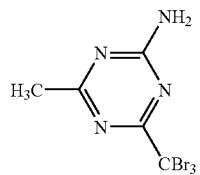

3

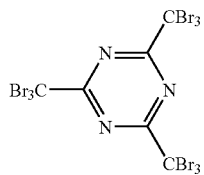

4

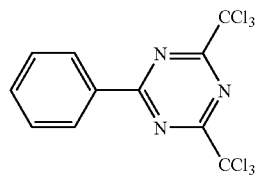

5

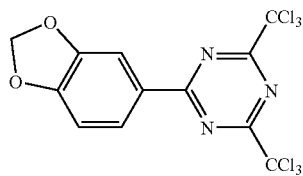

6

-continued
7
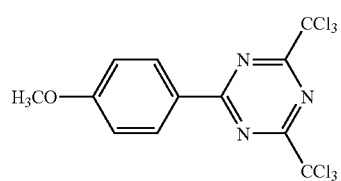
8
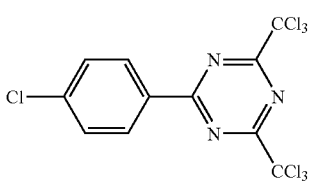
9
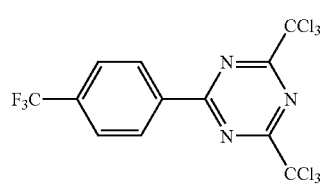
10
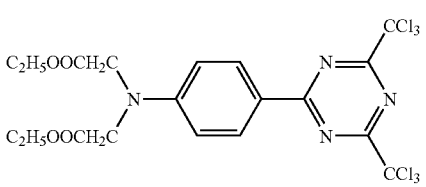
11
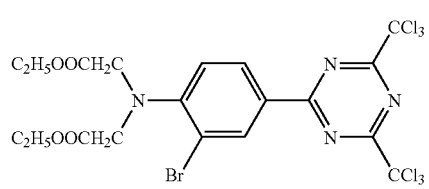
12
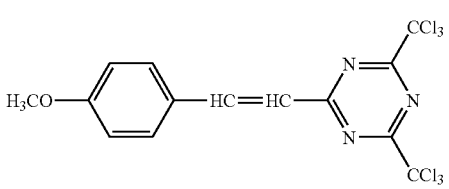
13
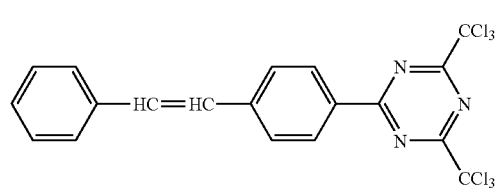
14
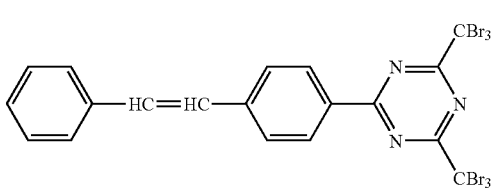
15
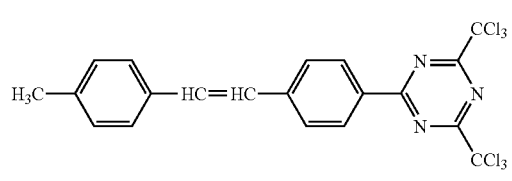
16
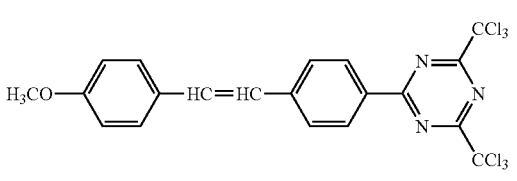
17
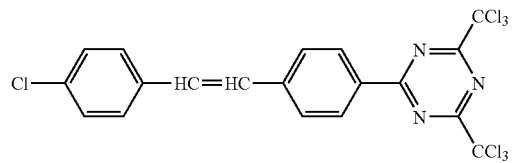
18
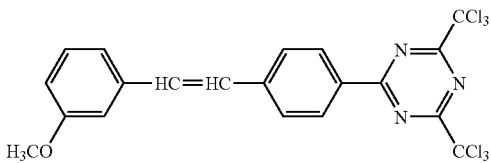
19
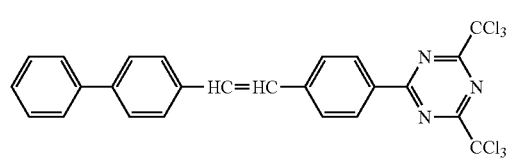
20
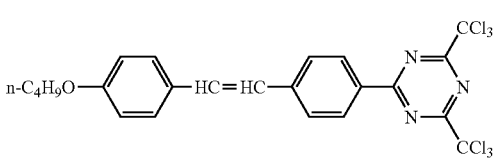
21
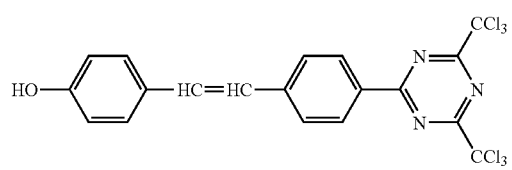
22
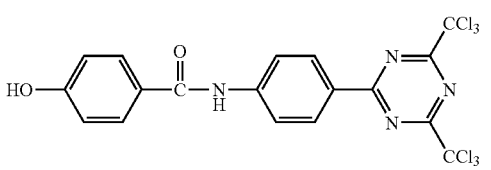
23
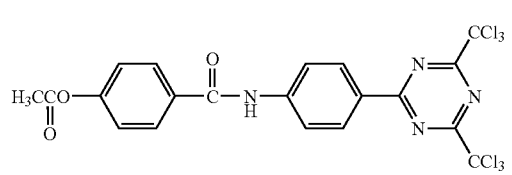
24-1
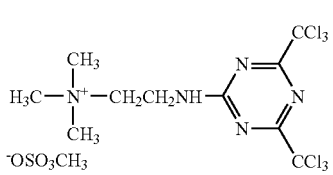

-continued

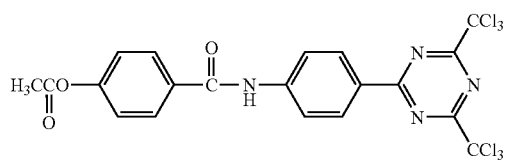
24-2

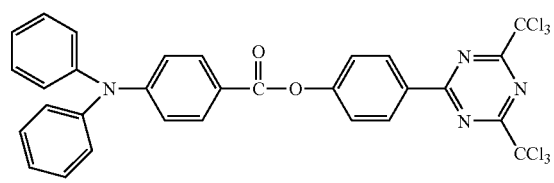
24-3

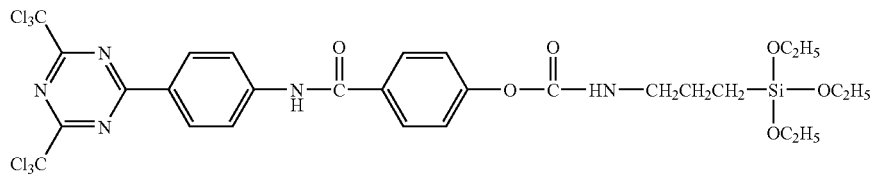
24-4

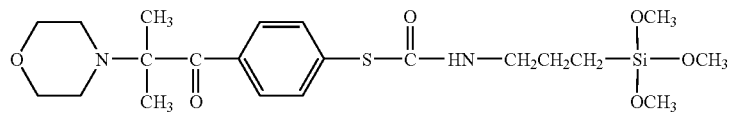
24-5

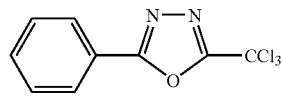
25

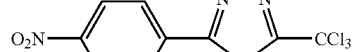
26

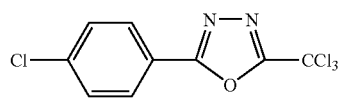
27

28

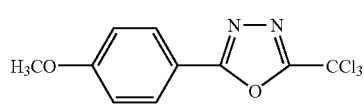
29

30

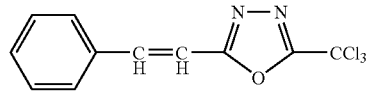
31

32

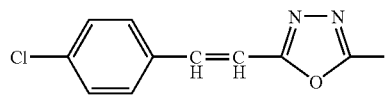
33

34

35

36

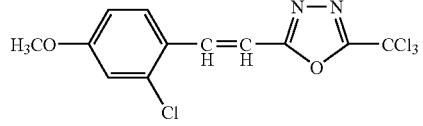
37

38

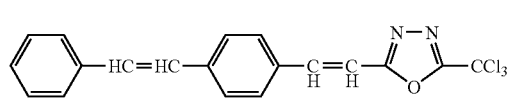
39

40

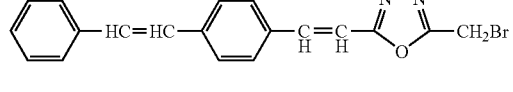

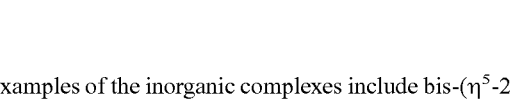

Examples of the inorganic complexes include bis-($\eta^5$-2,4-cyclopentadien-1-yl)-bis[2,6-difluoro-3-(1H-pyrrol-1-yl)-phenyl]titanium. Examples of the coumarins include 3-ketocoumarin.

These initiators may be used individually or as a mixture.

In the present invention, the compound having a high molecular weight and less volatilizing from the coating film is preferably an oligomer-type polymerization initiator. The oligomer-type radiation polymerization initiator is not particularly limited as long as it has a site which generates a photoradical upon irradiation with radiation. For preventing volatilization due to heat treatment, the molecular weight of the polymerization initiator is preferably from 280 to 10,000, more preferably from 300 to 10,000. Still more preferably, the mass average molecular weight is from 400 to 10,000. When the mass average molecular weight is 400 or more, the volatility is low and this is preferred, and when the mass average molecular weight is 10,000 or less, a cured film having sufficiently high hardness can be advantageously obtained. Specific examples of the oligomer-type radiation polymerization initiator include oligo[2-hydroxy-2-methyl-1-{4-(1-methylvinyl)phenyl}propanone] represented by the following formula (5).

Formula (5):

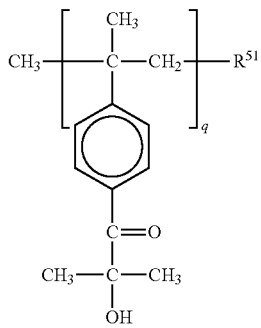

In formula (5), $R^{51}$ represents a monovalent group, preferably a monovalent organic group, and q represents an integer of 2 to 45.

Examples of the commercial product for the oligo[2-hydroxy-2-methyl-1-{4-(1-methylvinyl)phenyl}propanone] represented by formula (5) include "Esacure KIP150" (CAS-No. 163702-01-0, q=4 to 6), "Esacure KIP65LT" (a mixture of "Esacure KIP150" and tripropylene glycol diacrylate), "Esacure KIP100F" (a mixture of "Esacure KIP150" and 2-hydroxy-2-methyl-1-phenylpropan-1-one), "Esacure KT37", "Esacure KT55 (both a mixture of "Esacure KIP 150" and a methyl benzophenone derivative), "Esacure KT046 (a mixture of "Esacure KIP150", a methyl benzophenone derivative and 2,4,6-trimethylbenzoyldiphenylphosphine oxide), and "Esacure KIP75/B" (a mixture of "Esacure KIP150" and 2,2-dimethoxy-1,2-diphenylethan-1-one), trade names, produced by Fratelli Lamberti.

Various examples are also described in Saishin UV Koka Gijutsu (Latest UV Curing Technologies), page 159, Technical Information Institute Co., Ltd. (1991), and Kiyomi Kato, Shigaisen Koka System (Ultraviolet Curing System), pp. 65-148, Sogo Gijutsu Center (1989), and these are useful in the present invention.

Preferred examples of the commercially available photoradical polymerization initiator of photo-cleavage type include "Irgacure 651", "Irgacure 184", "Irgacure 819", "Irgacure 907", "Irgacure 1870" (a 7/3 mixed initiator of CGI-403/Irg184), "Irgacure 500", "Irgacure 369", "Irgacure 1173", "Irgacure 2959", "Irgacure 4265", "Irgacure 4263", "Irgacure 127" and "OXE01" produced by Ciba Specialty Chemicals Corp.; "KAYACURE DETX-S", "KAYACURE BP-100", "KAYACURE BDMK", "KAYACURE CTX", "KAYACURE BMS", "KAYACURE 2-EAQ", "KAYACURE ABQ", "KAYACURE CPTX", "KAYACURE EPD", "KAYACURE ITX", "KAYACURE QTX", "KAYACURE BTC" and "KAYACURE MCA" produced by Nippon Kayaku Co., Ltd.; "Esacure (KIP100F, KB1, EB3, BP, X33, KTO46, KT37, KIP150, TZT)" produced by Sartomer Company, Inc.; and a mixture thereof.

The photopolymerization initiator is preferably used in an amount of 0.1 to 15 parts by mass, more preferably from 1 to 10 parts by mass, per 100 parts by mass of the binder.

In addition to the photopolymerization initiator, a photosensitizer may be used. Specific examples of the photosensitizer include n-butylamine, triethylamine, tri-n-butylphosphine, Michler's ketone and thioxanthone. Furthermore, one or more auxiliary agents such as azide compound, thiourea compound and mercapto compound may be used in combination.

Examples of the commercially available photosensitizer include "KAYACURE (DMBI, EPA)" produced by Nippon Kayaku Co., Ltd.

(Thermal Radical Initiator)

As for the thermal radical initiator, an organic or inorganic peroxide, an organic azo or diazo compound, or the like may be used.

Examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2,2'-azobis (isobutyronitrile), 2,2'-azobis(propionitrile) and 1,1'-azobis (cyclohexanecarbonitrile); and examples of the diazo compound include diazoaminobenzene and p-nitrobenzenediazonium.

The thermal radical initiator is preferably used in an amount of 0.1 to 15 parts by mass, more preferably from 1 to 10 parts by mass, per 100 parts by mass of the binder.

(Layer Construction of Optical Film)

The optical film (antireflection film) of the present invention has at least one antireflection layer which is stacked on a transparent substrate (hereinafter sometimes referred to as a "support") by taking into account the refractive index, film thickness, number of layers, order of layers, and the like.

The optical film of the present invention generally has, as a simplest construction, a construction where only a low refractive index layer is provided by coating on a substrate. In order to more reduce the reflectance, the antireflection layer is preferably constituted by combining a high refractive index layer having a refractive index higher than that of the substrate and a low refractive index layer having a refractive index lower than that of the substrate. Examples of the construction include a two-layer construction of high refractive index layer/low refractive index layer from the substrate side, and a construction formed by stacking three layers differing in the refractive index in the order of a medium refractive index layer (a layer having a refractive index higher than that of the substrate or hardcoat layer but lower than that of the high refractive index layer)/a high refractive index layer/a low refractive index layer. A construction where a larger number of antireflection layers are stacked is also proposed. In view of durability, optical property, cost, productivity and the like, it is preferred to coat a medium refractive index layer/a high refractive index layer/a low refractive index layer in this order on a substrate having thereon a hardcoat layer.

Preferred examples of the layer construction for the optical film of the present invention include the followings. In the constructions below, when "(antistatic layer)" is annexed, this means that the layer having other functions has an antistatic layer function in combination. By designing the antistatic layer to have a function other than the antistatic function, the number of layers formed can be decreased and this is preferred in terms of higher productivity.

Support/antistatic layer/low refractive index layer
Support/low refractive index layer (antistatic layer)
Support/antiglare layer (antistatic layer)/low refractive index layer
Support/antiglare layer/antistatic layer/low refractive index layer
Support/hardcoat layer/antiglare layer (antistatic layer)/low refractive index layer
Support/hardcoat layer/antiglare layer/antistatic layer/low refractive index layer
Support/hardcoat layer/antistatic layer/antiglare layer/low refractive index layer
Support/hardcoat layer (antistatic layer)/antiglare layer/low refractive index layer
Support/hardcoat layer/high refractive index layer/antistatic layer/low refractive index layer
Support/hardcoat layer/high refractive index layer (antistatic layer)/low refractive index layer
Support/hardcoat layer/antistatic layer/high refractive index layer/low refractive index layer
Support/hardcoat layer/medium refractive index layer/high refractive index layer (antistatic layer)/low refractive index layer
Support/hardcoat layer/medium refractive index layer (antistatic layer)/high refractive index layer/low refractive index layer
Support/hardcoat layer (antistatic layer)/medium refractive index layer/high refractive index layer/low refractive index layer
Support/antiglare layer/high refractive index layer (antistatic layer)/low refractive index layer
Support/antiglare layer/medium refractive index layer (antistatic layer)/high refractive index layer/low refractive index layer
Support/antistatic layer/hardcoat layer/medium refractive index layer/high refractive index layer/low refractive index layer
Antistatic layer/support/hardcoat layer/medium refractive index layer/high refractive index layer/low refractive index layer
Support/antistatic layer/antiglare layer/medium refractive index layer/high refractive index layer/low refractive index layer
Antistatic layer/support/antiglare layer/medium refractive index layer/high refractive index layer/low refractive index layer
Antistatic layer/support/antiglare layer/high refractive index layer/low refractive index layer/high refractive index layer/low refractive index layer Insofar as the reflectance can be reduced by the optical interference, the layer construction is not particularly limited only to these layer constructions.

(Transparent Support)

The support of the film of the present invention is not particularly limited and may be a transparent resin film, a transparent resin plate, a transparent resin sheet or a transparent glass. Examples of the transparent resin film which can be used include a cellulose acylate film (e.g., cellulose triacetate film (refractive index: 1.48), cellulose diacetate film, cellulose acetate butyrate film, cellulose acetate propionate film), a polyethylene terephthalate film, a polyethersulfone film, a polyacrylic resin film, a polyurethane-based resin film, a polyester film, a polycarbonate film, a polysulfone film, a polyether film, a polymethylpentene film, a polyether ketone film and a (meth)acrylonitrile film.

(Cellulose Acylate Film)

Among these, a cellulose acylate film generally used as a protective film of a polarizing plate is preferred because of high transparency, less optical birefringence and easy production, and a cellulose triacetate film is more preferred. The thickness of the transparent support is usually on the order of 25 to 1,000 μm.

In the present invention, a cellulose acetate having an acetylation degree of 59.0 to 61.5% is preferably used for the cellulose acylate film. The acetylation degree means the amount of acetic acid bonded per unit mass of cellulose. The acetylation degree is determined according to the measurement and calculation of acetylation degree in ASTM:D-817-91 (Test Method of Cellulose Acetate, etc.). The viscosity average polymerization degree (DP) of the cellulose acylate is preferably 250 or more, more preferably 290 or more.

Also, in the cellulose acylate for use in the present invention, the Mw/Mn (Mw is the mass average molecular weight and Mn is the number average molecular weight) value by gel permeation chromatography is preferably close to 1.0, in other words, the molecular weight distribution is preferably narrow. Specifically, the Mw/Mn value is preferably from 1.0 to 1.7, more preferably from 1.3 to 1.65, and most preferably from 1.4 to 1.6.

In general, the hydroxyl groups at the 2-, 3- and 6-positions of the cellulose acylate are not equally ⅓ distributed, but the substitution degree of 6-position hydroxyl group tends to be small. In the present invention, the substitution degree of 6-position hydroxyl group of the cellulose acylate is preferably larger as compared with the 2- or 3-position.

The hydroxyl group at the 6-position is preferably substituted by an acyl group in a proportion of 32% or more, more preferably 33% or more, still more preferably 34% or more, based on the entire substitution degree. Furthermore, the substitution degree for the 6-position acyl group of cellulose acylate is preferably 0.88 or more. The 6-position hydroxyl group may be substituted, in addition to the acetyl group, by an acyl group having a carbon number of 3 or more, such as propionyl group, butyroyl group, valeroyl group, benzoyl group or acryloyl group. The substitution degree at each position can be measured by NMR.

As regards the cellulose acylate for use in the present invention, cellulose acetates synthesized by the methods disclosed in JP-A-11-5851, "Example" and "Synthesis Example 1" of paragraphs [0043] and [0044], "Synthesis Example 2" of paragraphs [0048] and [0049], and "Synthesis Example 3" of paragraphs [0051] and [0052], can be used.

(Polyethylene Terephthalate Film)

In the present invention, a polyethylene terephthalate film may also be preferably used, because this film is excellent in all of transparency, mechanical strength, planarity, chemical resistance and moisture resistance and moreover, is inexpensive.

The transparent plastic film is more preferably subjected to an easy adhesion treatment so as to further enhance the adhesion strength between the transparent plastic film and the hardcoat layer provided thereon. Examples of the commercially available optical PET film with an easy adhesion layer include COSMOSHINE A4100 and A4300 produced by Toyobo Co., Ltd.

[Coating Composition]

The coating composition of the present invention contains (A) an inorganic fine particle, (B) a fluorine-containing copolymer, and (C) a polyfunctional fluorine-containing acrylate. The ratio (mass %) of solid contents in the coating composition is preferably prepared to satisfy a ratio of (A):(B):(C)=from 10 to 70:from 1 to 70:from 1 to 70, with the total amount being 100. In the present invention, the content of the fluorine-containing copolymer (B) is preferably larger than that of the polyfunctional fluorine-containing acrylate (C).

The content of (A) is preferably from 10 to 70 mass %, more preferably from 20 to 70 mass %, still more preferably from 30 to 70 mass %, yet still more preferably from 40 to 60 mass %, based on all solid contents in the coating composition. When the content is 70 mass % or less, the scratch resistance can be more enhanced. In the present invention, the content of (B) is preferably from 1 to 40 mass %, more preferably from 5 to 30 mass %, and most preferably from 5 to 20 mass %, based on all solid contents in the coating composition. Also, the content of (C) is preferably from 5 to 50 mass %, more preferably from 10 to 40 mass %, and most preferably from 15 to 30 mass %, based on all solid contents in the coating composition. The coating composition may further contain a polymerization initiator, a viscosity adjusting agent (e.g., solvent, polymer compound) for adjusting the viscosity of the coating solution, and an additive such as coating aid, each in an appropriate amount (for example, approximately from 0 to 10 mass %). In order to ensure low refractive index and no white turbidity and satisfy both scratch resistance and antifouling durability, the contents of (A), (B) and (C) are preferably in the above-described ranges.

In the present invention, it is preferred to appropriately add a non-fluorine-containing polyfunctional monomer as a component (D). The component (D) is preferably added in an amount of 0 to 30 mass %, more preferably from 1 to 20 mass %, and most preferably from 5 to 15 mass %, based on the entire solid content of the coating solution. Addition in an amount of 30% or less enables suppression of increase in the refractive index, that is, increase in the reflectance.

In the coating composition, a solvent may be further used. In the case of using a solvent, the solvent is preferably used such that the solid content concentration in the coating composition becomes from 0.1 to 90 mass %, more preferably from 1 to 20 mass %, and most preferably from 1 to 10 mass %.

[Solvent]

The solvent which dissolves the compound is not particularly limited, but an alcohol-based solvent or a ketone-based solvent is preferably used. Specific examples thereof include acetone, methyl ethyl ketone, 2-pentanone, 3-pentanone, 2-hexane, 2-heptanone, 4-heptanone, methyl isopropyl ketone, ethyl isopropyl ketone, diisopropyl ketone, methyl isobutyl ketone, methyl-tert-butyl ketone, diacetyl, acetylacetone, acetonylacetone, diacetone alcohol, mesityl oxide, chloroacetone, cyclopentanone, cyclohexanone and acetophenone. Among these, methyl ethyl ketone and methyl isobutyl ketone are preferred. One of these solvents may be used alone, or several kinds thereof may be mixed in an arbitrary mixing ratio and used.

Also, an ester-based solvent such as propylene glycol monomethyl ether acetate, or a fluorine-based solvent (e.g., fluorine-based alcohol) may be appropriately used as an auxiliary solvent. One of these solvents be used alone, or several kinds thereof may be mixed in an arbitrary mixing ratio and used. The coating composition of the present invention has good solubility even without using a fluorine-based solvent and causes no white turbidity, and a coating film excellent in the scratch resistance, antifouling property and the like is obtained.

(Coating Method)

The optical film of the present invention can be formed by the following method, but the present invention is not limited to this method. First, a coating composition containing components for forming each layer is prepared. Next, the coating composition prepared is coated on a transparent support by a dip coating method, an air knife coating method, a curtain coating method, a roller coating method, a wire bar coating method, a gravure coating method or a die coating method and then heated/dried. A microgravure coating method, a wire bar coating method and a die coating method (see, U.S. Pat. No. 2,681,294 and JP-A-2006-122889) are preferred, and a die coating method is more preferred.

After the coating, the layer formed of the coating composition is cured by irradiating light or under heating, whereby a low refractive index layer is formed. If desired, an optical layer (a layer constituting the film, which is described layer, for example, a hardcoat layer, an antiglare layer, a medium refractive index layer, or a high refractive index layer) may be previously coated on a transparent support, and a low refractive index layer may be formed thereon. In this way, the optical film of the present invention is obtained.

(Antiglare Layer)

The antiglare layer is formed for the purpose of providing the film with an antiglare property by surface scattering and preferably with a hardcoat property to enhance the scratch resistance of the film.

Known examples of the method for forming the antiglare layer include a method of forming the antiglare layer by laminating a matte shaped film having fine irregularities on the surface described in JP-A-6-16851; a method of forming the antiglare layer by varying the irradiation dose of ionizing radiation and thereby bringing about curing shrinkage of an ionizing radiation-curable resin described in JP-A-2000-206317; a method where the weight ratio of good solvent to light-transmitting resin is decreased through drying and a light-transmitting fine particle and a light-transmitting resin are thereby gelled and solidified to form irregularities on the coating film surface described in JP-A-2000-338310; and a method of imparting surface irregularities by applying an external pressure described in JP-A-2000-275404. These known methods can be utilized.

The antiglare layer which can be used in the present invention is preferably a layer containing, as essential components, a binder capable of imparting hardcoat property, a light-transmitting particle for imparting antiglare property, and a solvent, in which surface irregularities are formed by protrusion of the light-transmitting particle itself or protrusion formed by an aggregate of a plurality of particles.

The antiglare layer formed by the dispersion of matte particles is composed of a binder and a light-transmitting particle dispersed in the binder. The antiglare layer having antiglare property preferably has both antiglare property and hardcoat property.

Specific preferred examples of the matte particle include an inorganic compound particle such as silica particle and $TiO_2$ particle; and a resin particle such as acryl particle, crosslinked acryl particle, polystyrene particle, crosslinked styrene particle, melamine resin particle and benzoguanamine resin particle. Among these, a crosslinked styrene particle, a crosslinked acryl particle and a silica particle are more preferred.

The shape of the matte particle may be either spherical or indefinite.

The particle size distribution of the matte particle is measured by a Coulter counter method, and the measured distribution is converted into a particle number distribution.

By adjusting the refractive index of the light-transmitting resin in accordance with the refractive index of the light-transmitting particle selected from these particles, the internal haze and surface haze of the present invention can be achieved. More specifically, a combination of a light-transmitting resin (refractive index after curing: from 1.55 to 1.70) mainly comprising a trifunctional or greater functional (meth)acrylate monomer described later, which is preferably used in the antiglare layer of the present invention, with a light-transmitting particle comprising a crosslinked poly (meth)acrylate polymer having a styrene content of 50 to 100 mass % and/or a benzoguanamine particle is preferred, and a combination of the light-transmitting resin above and a light-transmitting particle (refractive index: from 1.54 to 1.59) comprising a crosslinked poly(styrene-acrylate) copolymer having a styrene content of 50 to 100 mass % is more preferred.

In view of preventing glare, image blur, surface clouding or glare, and the like, it is preferred to blend the light-transmitting particle such that its content in the formed antiglare layer is from 3 to 30 mass %, more preferably from 5 to 20 mass %, based on the entire solid content of the antiglare layer. If the content is less than 3 mass %, the antiglare property is insufficient, whereas if it exceeds 30 mass %, a problem such as image blur or surface clouding or glare arises.

The density of the light-transmitting particle is preferably from 10 to 1,000 $mg/m^2$, more preferably from 100 to 700 $mg/m^2$.

The absolute value of the difference between the refractive index of the light-transmitting resin and the refractive index of the light-transmitting particle is preferably 0.04 or less. The absolute value of the difference between the refractive index of the light-transmitting resin and the refractive index of the light-transmitting particle is preferably from 0.001 to 0.030, more preferably from 0.001 to 0.020, still more preferably from 0.001 to 0.015. If this difference exceeds 0.040, there arises a problem such as blur of the film character, reduction of the dark-room contrast, or clouding of the surface.

The refractive index of the light-transmitting resin can be quantitatively evaluated through direct measurement by an Abbe refractometer or by measuring the spectral reflection spectrum or spectral ellipsometry. The refractive index of the light-transmitting particle is determined as follows. The light-transmitting particle is dispersed in an equal amount in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

Also, two or more kinds of matte particles differing in the particle diameter may be used in combination. The matte particle having a larger particle diameter can impart antiglare property and the matte particle having a smaller particle diameter can impart another optical property. For example, when an antiglare antireflection film is laminated on a high-definition display of 133 ppi or more, a trouble in view of display image quality, called "glare", is sometimes generated. The "glare" is ascribable to loss of brightness uniformity resulting from enlargement or shrinkage of a pixel due to irregularities present on the antiglare antireflection film surface, but this can be greatly improved by using together a matte particle having a particle diameter smaller than that of the antiglare property-imparting matte particle and having a refractive index different from that of the binder.

The film thickness of the antiglare layer is usually on the order of 0.5 to 50 µm, preferably from 1 to 35 µm, more preferably from 1 to 25 µm. If the thickness is too small, the hardcoat property is insufficient, whereas if it is excessively large, the curling or brittleness is worsened and the processing suitability may deteriorate. Therefore, the film thickness is preferably in the above-described range.

The centerline average roughness (Ra) of the antiglare layer is preferably from 0.10 to 0.40 µm. If the centerline average roughness exceeds 0.40 µm, there arises a problem such as glare or surface whitening due to reflection of outside light. The value of the transmitted image clarity is preferably set to be from 5 to 60%.

The strength of the antiglare layer is preferably H or more, more preferably 2H or more, still more preferably 3H or more, in the pencil hardness test.

(Hardcoat Layer)

In the film of the present invention, in addition to the antiglare layer, a hardcoat layer may be provided so as to impart physical strength to the film.

A low refractive index layer is preferably provided thereon, and a medium refractive layer and a high refractive layer are more preferably provided between the hardcoat layer and the low refractive index layer, whereby an antireflection film is fabricated.

The hardcoat layer may be composed of a stack of two or more layers.

In the present invention, in view of optical design for obtaining an antireflection film, the refractive index of the hardcoat layer is preferably from 1.48 to 2.00, more preferably from 1.52 to 1.90, still more preferably from 1.55 to 1.80. In the present invention, at least one low refractive index is present on the hardcoat layer and therefore, if the refractive index is smaller than the above-described range, the antireflection property may decrease, whereas if it is excessively large, the color tint of reflected light tends to be intensified.

From the standpoint of imparting sufficient durability and impact resistance to the film, the film thickness of the hardcoat layer is preferably a film thickness described for the antiglare layer.

The strength of the hardcoat layer is preferably H or more, more preferably 2H or more, and most preferably 3H or more, in the pencil hardness test.

Furthermore, in the Taber test according to JIS K5400, the abrasion loss of the specimen between before and after test is preferably smaller.

The hardcoat layer is preferably formed through a crosslinking or polymerization reaction of an ionizing radiation-curable compound. For example, a coating composition containing an ionizing radiation-curable polyfunctional monomer or polyfunctional oligomer is coated on a transparent support, and a crosslinking or polymerization reaction of the polyfunctional monomer or polyfunctional oligomer is brought about, whereby the hardcoat layer can be formed.

The functional group in the ionizing radiation-curable polyfunctional monomer or polyfunctional oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group. Among these, a (meth)acryloyl group is preferred.

For the purpose of imparting internal scattering property, the hardcoat layer may contain a matte particle, for example, an inorganic compound particle or a resin particle, having an average particle diameter of 1.0 to 10.0 µm, preferably from 1.5 to 7.0 µm.

For the purpose of controlling the refractive index of the hardcoat layer, a high refractive index monomer, an inorganic fine particle, or both may be added to the binder of the hardcoat layer. The inorganic fine particle has an effect of suppressing curing shrinkage ascribable to the crosslinking reaction, in addition to the effect of controlling the refractive index. In the present invention, the term "binder" is used including a polymer produced by the polymerization of the polyfunctional monomer and/or the high refractive index monomer or the like after the formation of the hardcoat layer, and the inorganic particle dispersed therein.

For the purpose of maintaining the sharpness of the image, the transmitted image clarity is preferably adjusted in addition to the adjustment of surface irregularity shape. The transmitted image clarity of a clear antireflection film is preferably 60% or more. The transmitted image clarity is generally an index showing the degree of blur of an image transmitted and projected on the film and as this value is larger, the image viewed through the film is clearer and better. The transmitted image clarity is preferably 70% or more, more preferably 80% or more.

(High Refractive Index Layer, Medium Refractive Index Layer)

In the film of the present invention, a high refractive index layer and a medium refractive index layer may be provided to enhance the antireflection property. In the following, these high and medium refractive index layers are sometimes collectively referred to as a high refractive index layer. Incidentally, in the present invention, the terms "high", "medium" and "low" in the high refractive index layer, medium refractive index layer and low refractive index indicate the relative size of refractive index among layers. In terms of the relationship with the transparent support, the refractive index preferably satisfies the relationships of transparent support>low refractive index layer, and high refractive index layer>transparent support. Also, in the present invention, the high, medium and low refractive index layers are sometimes collectively referred to as an antireflection layer.

For producing an antireflection film by forming a low refractive index layer on a high refractive index layer, the refractive index of the high refractive index layer is preferably from 1.53 to 2.40, more preferably from 1.60 to 2.20, still more preferably from 1.65 to 2.10, and most preferably from 1.80 to 2.00.

In the case of producing an antireflection film by providing a medium refractive index layer, a high refractive index layer and a low refractive index layer in this order from the support side, the refractive index of the high refractive index layer is preferably from 1.60 to 2.40, more preferably from 1.65 to 2.20, and most preferably from 1.65 to 2.00. The refractive index of the medium refractive index layer is adjusted to a value between the refractive index of the low refractive index layer and the refractive index of the high refractive index layer. The refractive index of the medium refractive index layer is preferably from 1.55 to 1.80.

The inorganic particle comprising $TiO_2$ as a main component, for use in the high refractive index layer and medium refractive index layer, is used in a dispersion state for the formation of the high refractive index layer and the medium refractive index layer.

In dispersing the inorganic fine particle, the inorganic particle is dispersed in a dispersion medium in the presence of a dispersant.

The high refractive index layer and medium refractive index layer for use in the present invention each is preferably formed as follows. A coating composition for the formation of the high or medium refractive index layer is prepared by dispersing an inorganic particle in a dispersion medium and preferably further adding a binder precursor (for example, an ionizing radiation-curable polyfunctional monomer or polyfunctional oligomer described later) necessary for the matrix formation, a photopolymerization initiator and the like to the resulting liquid dispersion, and the obtained coating composition for the formation of the high or medium refractive index layer is coated on a transparent support and cured through a crosslinking or polymerization reaction of the ionizing radiation-curable compound (for example, a polyfunctional monomer or polyfunctional oligomer).

Simultaneously with or after the coating of the high or medium refractive index layer, the binder of the layer is preferably crosslinked or polymerized with the dispersant.

The binder of the thus-produced high or medium refractive index layer takes a form such that the anionic group of the dispersant is taken into the binder as a result of the crosslinking or polymerization reaction between the above-described preferred dispersant and the ionizing radiation-curable polyfunctional monomer or polyfunctional oligomer. The anionic group taken into the binder of the high or medium refractive index layer has a function of maintaining the dispersed state of the inorganic fine particle, and the crosslinked or polymerized structure imparts a film-forming ability to the binder, whereby the physical strength, chemical resistance and weather resistance of the high or medium refractive index layer containing the inorganic fine particle are improved.

The binder of the high refractive index layer is added in an amount of 5 to 80 mass % based on the solid content of the coating composition for the layer.

The content of the inorganic particle in the high refractive index layer is preferably from 10 to 90 mass %, more preferably from 15 to 80 mass %, still more preferably from 15 to 75 mass %, based on the mass of the high refractive index layer. Two or more kinds of inorganic particles may be used in combination in the high refractive index layer.

In the case of having a low refractive index layer on the high refractive index layer, the refractive index of the high refractive index layer is preferably higher than the refractive index of the transparent support.

In the high refractive index layer, a binder obtained by a crosslinking or polymerization reaction of an aromatic ring-containing ionizing radiation-curable compound, an ionizing radiation-curable compound containing a halogen element (e.g., Br, I, Cl) except for fluorine, an ionizing radiation-curable compound containing an atom such as S, N and P, or the like may also be preferably used.

The film thickness of the high refractive index layer may be appropriately designed according to the usage. In the case of using the high refractive index layer as an optical interference layer described later, the film thickness is preferably from 30 to 200 nm, more preferably from 50 to 170 nm, still more preferably from 60 to 150 nm.

In the case of not containing an antiglare function-imparting particle, the haze of the high refractive index layer is preferably lower. The haze is preferably 5% or less, more preferably 3% or less, still more preferably 1% or less.

The high refractive index layer is preferably formed on the transparent support directly or through another layer.

(Low Refractive Index Layer)

In order to reduce the reflectance of the film of the present invention, a low refractive index layer may be used. The refractive index of the low refractive index layer is preferably from 1.20 to 1.46, more preferably from 1.25 to 1.40, still more preferably from 1.30 to 1.37.

The thickness of the low refractive index layer is preferably from 30 to 500 nm, more preferably from 70 to 500 nm. For imparting electrical conductivity, the low refractive index layer is preferably formed to a thickness of 130 to 500 nm.

The haze of the low refractive index layer is preferably 3% or less, more preferably 2% or less, and most preferably 1% or less.

The strength of the low refractive index layer is preferably H or more, more preferably 2H or more, and most preferably 3H or more, in the pencil hardness test with a load of 500 g.

In order to improve the antifouling performance of the optical film, the contact angle for water of the surface is preferably 90° or more, more preferably 95° or more, still more preferably 100° or more.

(Antistatic Layer, Electrically Conductive Layer)

In the present invention, an antistatic layer is preferably provided for preventing the film surface from electrostatic charging. Examples of the method for forming an antistatic layer include conventionally known methods such as a method of coating an electrically conductive coating solution containing an electrically conductive fine particle and a reactive curable resin, a method of vapor-depositing or sputtering a transparent film-forming metal or metal oxide or the like to form an electrically conductive thin film, and a method of incorporating an electrically conductive polymer such as polythiophene or polyaniline. The electrically conductive layer may be formed on a support directly or through a primer layer that strengthens the adhesion to the support. Also, the antistatic layer may be used as a part of the antireflection film.

The thickness of the antistatic layer is preferably from 0.01 to 10 μm, more preferably from 0.03 to 7 μm, still more preferably from 0.05 to 5 μm. The surface resistance of the antistatic layer is preferably from $10^5$ to $10^{12}$ Ω/sq, more preferably from $10^5$ to $10^9$ Ω/sq, and most preferably from $10^5$ to $10^8$ Ω/sq. The surface resistance of the antistatic layer can be measured by a four-probe method.

The antistatic layer is preferably substantially transparent. Specifically, the haze of the antistatic layer is preferably 10% or less, more preferably 5% or less, still more preferably 3% or less, and most preferably 1% or less. The transmittance for light at a wavelength of 550 nm is preferably 50% or more, more preferably 60% or more, still more preferably 65% or more, and most preferably 70% or more.

The antistatic layer of the present invention has excellent strength. Specifically, the strength of the antistatic layer is, in terms of the pencil hardness with a load of 1 kg, preferably H or more, more preferably 2H or more, still more preferably 3H or more, and most preferably 4H or more.

The polarizing plate of the present invention is a polarizing plate having a polarizing film and a protective film provided on both sides of the polarizing film, wherein at least one protective film is the optical film of the present invention.

The optical film or polarizing plate of the present invention can be suitably used as an antireflection film, though the usage is not particularly limited. The antireflection film can be used in various image display devices such as such as liquid crystal display device (LCD), plasma display panel (PDP), electroluminescent display (ELD), cathode ray tube display (CRT), field emission display (FED), surface-conduction electron-emitter display (SED), so as to prevent reduction in the contrast due to reflection of outside light or disturbing image reflection.

The image display device (preferably liquid crystal display device) of the present invention has the optical film or polarizing plate of the present invention. The optical film or polarizing plate of the present invention is disposed on the display surface (on the viewing side of the display screen).

(Various Evaluations of Optical Film)
(Evaluation of Steel Wool Scratch Resistance)

The result of a rubbing test performed using a rubbing tester under the following conditions can be used as the index for scratch resistance.

Environmental conditions of evaluation: 25° C. and 60% RH
Rubbing Material:

A steel wool (Grade No. 0000, manufactured by Nippon Steel Wool K.K.) is wound around the rubbing tip (1 cm×1 cm) of the tester, which comes into contact with the sample, and fixed by a band not to move.

Moving distance (one way): 13 cm
Rubbing speed: 13 cm/sec
Load: 500 g/cm$^2$
Contact area of tip: 1 cm×1 cm
Number of rubbings: 10 reciprocations An oily black ink is applied to the back side of the rubbed sample, and the steel wool scratch resistance is evaluated by the observation with an eye of scratches in the rubbed portion through reflected light or by the difference from the reflected light quantity in the portions other than the rubbed portion.

(Specular Reflectance)

The specular reflectance is measured as follows. After loading an adapter "ARV-474" in a spectrophotometer "V-550" [manufactured by JASCO Corp.], the specular reflectance for the outgoing angle of −5° at an incident angle of 5° is measured in the wavelength region of 380 to 780 nm, an average reflectance at 450 to 650 nm is calculated, and the antireflection property can be evaluated by the value obtained.

The optical film of the present invention is preferably designed to have a specular reflectance of 2.0% or less, because the reflection of outside light can be suppressed and the visibility can be enhanced. The specular reflectance is more preferably 1.4% or less.

(Antifouling Durability Test)
<Marker Wiping Durability>

The film is fixed on a glass surface via a pressure-sensitive adhesive, and a circle of 5 mm in diameter is written thereon in three turns with a pen tip (fine) of a black marker, "Macky Gokuboso" (trade name, produced by ZEBRA Co.), under the conditions of 25° C. and 60% RH and after 5 seconds, wiped off with a 10-ply folded and bundled Bencot (trade name, produced by Asahi Kasei Corp.) by moving back and forth the bundle 20 times under a load large enough to make a dent in the Bencot bundle. The writing and wiping are repeated under the above-described conditions until the marker stain cannot be eliminated by the wiping, and the antifouling durability can be evaluated by the number of repetitions where the marker stain can be wiped off.

The number of repetitions until the marker stain cannot be eliminated is preferably 5 or more, more preferably 10 or more.

(Evaluation of White Turbidity)

An oily black ink is applied to the back side of the sample, and the white turbidity is evaluated by observing the sample with an eye under sunlight.

EXAMPLES

The present invention is described in greater detail below by referring to Examples, but the present invention should not be construed as being limited to these Examples. Unless otherwise indicated, the "parts" and "%" are on the mass basis.

(Preparation of Coating Solution (HCL-1) for Hardcoat Layer)

10 Parts by mass of cyclohexanone, 95 parts by mass of partially caprolactone-modified polyfunctional acrylate (DPCA-20, produced by Nippon Kayaku Co., Ltd.), and 5 parts by mass of a photopolymerization initiator (Irgacure 184, produced by Ciba Specialty Chemicals Corp.) were added to 90 parts by mass of methyl ethyl ketone (MEK). The resulting mixture was stirred and then filtered through a polypropylene-made filter having a pore size of 0.4 μm to prepare Coating Solution (HCL-1) for Hardcoat Layer.

(Production of Optical Film Sample 1)

A 80 μm-thick triacetyl cellulose film "TAC-TD80U" {produced by Fujifilm Corp.} in a roll form was unrolled, and Coating Solution (HCL-1) for Hardcoat Layer was coated directly thereon by using a doctor blade and a microgravure roll having a diameter of 50 mm and having a gravure pattern with a line number of 180 lines/inch and a depth of 40 μm under the conditions of a gravure roll rotation number of 30 rpm and a conveying speed of 30 m/min. After drying at 60° C. for 150 seconds, the coated layer was cured by irradiating thereon an ultraviolet ray at a radiation illuminance of 400 mW/cm$^2$ and an irradiation dose of 70 mJ/cm$^2$ with use of "Air-Cooled Metal Halide Lamp" {manufactured by Eye Graphics Co., Ltd.} of 160 W/cm under nitrogen purging to an oxygen concentration of 0.1 vol %, thereby forming a layer having a thickness of 10.0 μm. The resulting film was taken up. In this way, Hardcoat Layer (HC-1) was obtained.

(Preparation of Hollow Silica Fine Particle Liquid Dispersion)

20 Parts of acryloyloxypropyltrimethoxysilane and 1.5 parts of diisopropoxyaluminum ethyl acetate were added to 500 parts of a hollow silica fine particle sol (isopropyl alcohol silica sol, CS60-IPA, produced by Catalysts & Chemicals Ind. Co., Ltd., average particle diameter: 60 nm, thickness of shell: 10 nm, silica concentration: 20%, refractive index of silica particle: 1.31) and mixed, and 9 parts of ion-exchanged water was added thereto. After allowing the reaction to proceed at 60° C. for 8 hours, the reaction solution was cooled to room temperature, and 1.8 parts of acetyl acetone was added to obtain Liquid Dispersion A. Subsequently, while adding cyclohexanone to make almost constant the silica content, solvent displacement was performed by distillation under reduced pressure at a pressure of 30 Torr, and the concentration was finally adjusted to obtain a liquid dispersion having a solid content concentration of 18.2%. The IPA residual amount in the obtained liquid dispersion was analyzed by gas chromatography and found to be 0.5% or less.

(Synthesis of Fluorine-Containing Polyfunctional Acrylate)

By the same method as in the synthesis above of Compound (C-6), a compound where the moiety for r of (C-6) is 4 on average, a compound where the moiety is 7 on average and a compound where the moiety is 105 on average were synthesized. The obtained compounds were designated as (C-6-2), (C-6-3) and (C-6-4), respectively. Also, by the same method as in the synthesis of Compound (C-6), a compound where r is 4 on average was synthesized for (C-4), and this compound was designated as (C-4-2).

(Preparation of Coating Solution for Low Refractive Index Layer)

Respective components were mixed as shown in Table 1 and dissolved in MEK to prepare a coating solution for low refractive index layer having a solid content of 6%.

TABLE 1

| Coating Solution No. | Polymerization Initiator | | Fluorine-Containing Polyfunctional Monomer | | Non-Fluorine-Containing Polyfunctional Monomer | | RMS-033 | Liquid Dispersion A | Remarks |
|---|---|---|---|---|---|---|---|---|---|
| | P-1 | Kind Amount | Kind | Amount | Kind | Amount | | | |
| Ln1 | 65 | Irg. 127  3 | — | — | DPHA | 8 | 4 | 20 | Comparative Example |
| Ln2 | 45 | Irg. 127  3 | — | — | DPHA | 8 | 4 | 40 | Comparative Example |
| Ln3 | 30 | Irg. 127  3 | — | — | DPHA | 8 | 4 | 55 | Comparative Example |
| Ln4 | 15 | Irg. 127  3 | C-6 | 15 | DPHA | 8 | 4 | 55 | Invention |
| Ln5 | 15 | Irg. 127  3 | C-6-2 | 15 | DPHA | 8 | 4 | 55 | Invention |
| Ln6 | 15 | Irg. 127  3 | C-6-3 | 15 | DPHA | 8 | 4 | 55 | Invention |
| Ln7 | 15 | Irg. 127  3 | C-4 | 15 | DPHA | 8 | 4 | 55 | Invention |
| Ln8 | 15 | Irg. 127  3 | C-4-2 | 15 | DPHA | 8 | 4 | 55 | Invention |
| Ln9 | 34 | Irg. 127  3 | — | — | DPHA | 8 | 0 | 55 | Comparative Example |
| Ln10 | 15 | Irg. 127  3 | C-6-4 | 15 | DPHA | 8 | 4 | 55 | Comparative Example |

The abbreviations in the Table indicate the followings.
"P-1":
Fluorine-Containing Copolymer P-3 (weight average molecular weight: about 50,000) described in JP-A-2004-45462.
DPHA:
A mixture of dipentaerythritol pentaacrylate and dipentaerythritol hexaacrylate, produced by Nippon Kayaku Co., Ltd.
Irg. 127:
Irgacure 127, a polymerization initiator (produced by Ciba-Geigy Corp.).
C-4, C-6:
Compounds shown above (fluorine-containing polyfunctional acrylate).
RMS-033:
Methacryloxy-modified silicone (produced by Gelest Inc.).

(Preparation of Coating Solution A for Medium Refractive Index Layer)

3.0 Parts by mass of a mixture (DPHA) of dipentaerythritol pentaacrylate and dipentaerythritol hexaacrylate, 0.1 parts by mass of a photopolymerization initiator (Irgacure 184, produced by Ciba Specialty Chemicals Corp.), and 86.9 parts by mass of methyl isobutyl ketone were added to 10.0 parts by mass of a ZrO$_2$ fine particle-containing hardcoat agent (Desolite Z7404 [refractive index: 1.72, solid content concentration: 60 mass %, content of zirconium oxide fine particle: 70 mass % (based on solid content), average particle diameter of zirconium oxide fine particle: about 20 nm, solvent composition: methyl isobutyl ketone (MIBK)/MEK=9/1, produced by JSR Corp.])., and the resulting mixture was stirred. After thorough stirring, the obtained solution was filtered through a polypropylene-made filter having a pore size of 0.4 μm to prepare Coating Solution A for Medium Refractive Index Layer.

(Preparation of Coating Solution A for High Refractive Index Layer)

85.0 Parts by mass of methyl isobutyl ketone was added to 15.0 parts by mass of a ZrO$_2$ fine particle-containing hardcoat agent (Desolite Z7404 [refractive index: 1.72, solid content concentration: 60 mass %, content of zirconium oxide fine particle: 70 mass % (based on solid content), average particle diameter of zirconium oxide fine particle: about 20 nm, solvent composition: MIBK/MEK=9/1, produced by JSR Corp.])., and the resulting mixture was stirred. The obtained solution was filtered through a polypropylene-made filter having a pore size of 0.4 μm to prepare Coating Solution A for High Refractive Index Layer.

(Coating of Sample Nos. 1 to 9 and 11)

On Hardcoat Layer (HC-1), Coating Solutions Ln1 to Ln10 for Low Refractive Index Layer each was coated by a microgravure coating method under adjustment to give a low refractive index layer thickness of 95 μm, whereby Antireflection Film Samples 1 to 9 and 11 were produced.

The drying conditions of the low refractive index layer were 60° C. and 60 seconds, and the ultraviolet curing was performed using an air-cooled metal halide lamp of 240 W/cm (manufactured by Eye Graphics Co., Ltd.) under the conditions of an illuminance of 600 mW/cm and an irradiation dose of 600 mJ/cm$^2$ while purging the system with nitrogen to create an atmosphere having an oxygen concentration of 0.1 vol % or less.

(Coating of Sample No. 10)

On Hardcoat Layer (HC-1), a medium refractive index layer was coated using Coating Solution A for Medium Refractive Index Layer by a microgravure coating method under adjustment to give a medium refractive index layer thickness of 60 nm, a high refractive index layer was then coated thereon using Coating Solution A for High Refractive Index Layer under adjustment to give a high refractive index layer thickness of 112 nm, and a low refractive index layer was finally provided using Coating Solution Ln-4 for Low Refractive Index Layer to a low refractive index layer thickness of 90 nm, whereby Antireflection Film Sample 10 were produced. The coating conditions of the low refractive index layer were the same as those in Antireflection Film Samples 1 to 9.

The drying conditions of the medium refractive index layer were 90° C. and 30 seconds, and the ultraviolet curing was performed using an air-cooled metal halide lamp of 180 W/cm (manufactured by Eye Graphics Co., Ltd.) under the conditions of an illuminance of 400 mW/cm$^2$ and an irradiation dose of 240 mJ/cm$^2$ while purging the system with nitrogen to create an atmosphere having an oxygen concentration of 1.0 vol % or less.

The drying conditions of the high refractive index layer were 90° C. and 30 seconds, and the ultraviolet curing was performed using an air-cooled metal halide lamp of 240 W/cm (manufactured by Eye Graphics Co., Ltd.) under the conditions of an illuminance of 400 mW/cm$^2$ and an irradiation dose of 240 mJ/cm$^2$ while purging the system with nitrogen to create an atmosphere having an oxygen concentration of 1.0 vol % or less.

(Evaluation of Optical Film)

Using the optical films obtained above, the following evaluations were performed.

(Evaluation 1) Evaluation of Steel Wool Scratch Resistance

After a test was performed by the method described above, an oily black ink was applied to the back side of the rubbed sample and scratches in the rubbed portion were observed with an eye through reflected light and evaluated according to the following criteria. The load was 500 g/cm$^2$ and the number of rubbings was 10 reciprocations.

A: Scratches were not recognized at all even when very carefully observed.

B: Faint scratches were slightly recognized when very carefully observed.

C: Faint scratches were recognized.

D: Medium scratches were recognized.

E: Scratches recognizable at the first glance were present.

(Evaluation 2) Evaluation of Antifouling Durability

After the test by the method described above, the number of repetitions until the marker stain could not be eliminated was determined. The number of repetitions until the marker stain cannot be eliminated is preferably 5 or more, more preferably 10 or more.

(Evaluation 3) Evaluation of White Turbidity

The evaluation was performed by the method described above and rated according to the following criteria.

A: White turbidity was not recognized even when very carefully observed.

B: White tinting was faintly recognized when very carefully observed.

C: The entire film was faintly white turbid.

D: Significant white turbidity of the entire film was recognized at the first glance.

(Evaluation 4) Evaluation of Specular Reflectance

The specular reflectance for the outgoing angle of −5° at an incident angle of 5° was measured by the method described above.

The evaluation results are shown in Table 2.

TABLE 2

| Sample No. | Coating Solution for Medium Refractive Index Layer | Coating Solution for High Refractive Index Layer | Low Refractive Index Layer | Hardcoat Layer | SW Scratch Resistance | White Turbidity | Antifouling Durability | Reflectance | Remarks |
|---|---|---|---|---|---|---|---|---|---|
| 1 | — | — | Ln1 | HC-1 | D | C | 6 | 1.71% | Comparative Example |
| 2 | — | — | Ln2 | HC-1 | D | D | 6 | 1.42% | Comparative Example |
| 3 | — | — | Ln3 | HC-1 | C | D | 8 | 1.07% | Comparative Example |

TABLE 2-continued

| Sample No. | Coating Solution for Medium Refractive Index Layer | Coating Solution for High Refractive Index Layer | Low Refractive Index Layer | Hardcoat Layer | SW Scratch Resistance | White Turbidity | Antifouling Durability | Reflectance | Remarks |
|---|---|---|---|---|---|---|---|---|---|
| 4 | — | — | Ln4 | HC-1 | A | A | 20 | 1.09% | Invention |
| 5 | — | — | Ln5 | HC-1 | A | A | 13 | 1.09% | Invention |
| 6 | — | — | Ln6 | HC-1 | C | A | 11 | 1.04% | Invention |
| 7 | — | — | Ln7 | HC-1 | A | A | 20 | 1.10% | Invention |
| 8 | — | — | Ln8 | HC-1 | A | A | 13 | 1.10% | Invention |
| 9 | — | — | Ln9 | HC-1 | E | C | 0 | 1.08% | Comparative Example |
| 10 | A | A | Ln4 | HC-1 | A | A | 20 | 0.40% | Invention |
| 11 | — | — | Ln10 | HC-1 | D | C | 16 | 1.00% | Comparative Example |

As seen from the results above, the antireflection film where a polyfunctional fluorine-containing acrylate (C) for use in the present invention is contained in the low refractive index layer containing an inorganic fine particle and a fluorine-containing copolymer and having a low refractive index is low in the refractive index, free of white turbidity and excellent in the scratch resistance and antifouling durability. The reason why not only the white turbidity but also the antifouling durability are improved by the addition of the component (C) is presumed because the antifouling component is firmly fixed in the film surface layer and becomes difficult of separation.

(Preparation of Coating Solution for Low Refractive Index Layer)

Respective components were mixed as shown in Table 3 and dissolved in MEK to prepare a coating solution for low refractive index layer having a solid content of 6%.

(Coating of Sample Nos. 12 to 15)

On Hardcoat Layer (HC-1), Coating Solutions Ln11 to Ln14 for Low Refractive Index Layer each was coated by a microgravure coating method under adjustment to give a low refractive index layer thickness of 95 nm, whereby Antireflection Film Samples 12 to 15 were produced.

The drying conditions of the low refractive index layer were 60° C. and 60 seconds, and the ultraviolet curing was performed using an air-cooled metal halide lamp of 240 W/cm (manufactured by Eye Graphics Co., Ltd.) under the conditions of an illuminance of 600 mW/cm$^2$ and an irradiation dose of 600 mJ/cm$^2$ while purging the system with nitrogen to create an atmosphere having an oxygen concentration of 0.1 vol % or less.

(Evaluation of Optical Film)

These optical films obtained were subjected to the above-described evaluations.

The evaluation results are shown in Table 4.

TABLE 3

| Coating Solution No. | Polymerization Initiator | | Fluorine-Containing Polyfunctional Monomer | | Non-Fluorine-Containing Polyfunctional Monomer | | Liquid | | Remarks |
|---|---|---|---|---|---|---|---|---|---|
| | P-1 | Kind Amount | Kind | Amount | Kind | Amount | RMS-033 | Dispersion A | |
| Ln11 | 23 | Irg. 127  3 | C-6 | 15 | — | — | 4 | 55 | Invention |
| Ln12 | 27 | Irg. 127  3 | C-6 | 3 | DPHA | 8 | 4 | 55 | Invention |
| Ln13 | 21 | Irg. 127  3 | C-6 | 9 | DPHA | 8 | 4 | 55 | Invention |
| Ln14 | 4 | Irg. 127  3 | C-6 | 56 | DPHA | 8 | 4 | 25 | Invention |

TABLE 4

| Sample No. | Low Refractive Index Layer | Hardcoat Layer | SW Scratch Resistance | White Turbidity | Antifouling Durability | Reflectance | Remarks |
|---|---|---|---|---|---|---|---|
| 4 | Ln4 | HC-1 | A | A | 20 | 1.09% | Invention |
| 12 | Ln11 | HC-1 | B | B | 20 | 0.95% | Invention |
| 13 | Ln12 | HC-1 | B | B | 11 | 1.09% | Invention |
| 14 | Ln13 | HC-1 | A | A | 15 | 1.09% | Invention |
| 15 | Ln14 | HC-1 | A | A | 20 | 1.52% | Invention |

As seen from the results above, the white turbidity and scratch resistance are improved by further adding (D) a non-fluorine-containing polyfunctional acrylate to the low refractive index layer containing (A) an inorganic fine particle, (B) a fluorine-containing copolymer and (C) a polyfunctional fluorine-containing acrylate and having a low refractive index.

According to the present invention, an antireflection film assured of low refractive index, excellent scratch resistance, excellent antifouling durability and reduction in the whitening (white turbidity) due to aggregation of inorganic fine particles can be obtained. Also, according to the present invention, an image display device (particularly a liquid crystal display device) having an antireflection film assured of low refractive index, excellent scratch resistance, excellent antifouling durability and reduction in the whitening (white turbidity) due to aggregation of inorganic fine particles can be obtained The entire disclosure of each and every foreign patent application from which the benefit of foreign priority has been claimed in the present application is incorporated herein by reference, as if fully set forth.

What is claimed is:
1. An optical film, comprising:
a transparent support; and
at least one low refractive index layer,
wherein one or more of the at least one low refractive index layer is a layer formed from a coating composition containing: (A) an inorganic fine particle; (B) a fluorine-containing copolymer; and (C) a polyfunctional fluorine-containing acrylate,
wherein one or more of the at least one refractive index layer has a refractive index of 1.20-1.46, and
the polyfunctional fluorine-containing acrylate (C) is represented by the following structural formula:

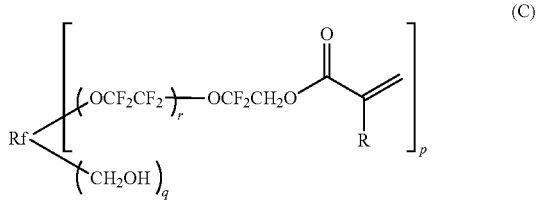

(C)

wherein Rf represents a (p+q)-valent perfluoro saturated hydrocarbon group having a carbon number of 1 to 20, which may have an ether bond;
p represents an integer of 3 to 6;
q represents an integer of 0 to 8, provided that (p+q) represents an integer of 3 to 10;
r represents an integer of 0 to 100; and
R represents a hydrogen atom, a methyl group, a fluorine atom or a trifluoromethyl group.
2. The optical film according to claim 1,
wherein the inorganic fine particle (A) has a size of 5 to 120 nm and accounts for 10 to 70 mass % based on the entire solid content in the coating composition.
3. The optical film according to claim 1,
wherein the inorganic fine particle (A) is surface-treated with at least one of a hydrolysate of an organosilane compound and a partial condensate thereof.
4. The optical film according to claim 1,
wherein at least one kind of the inorganic fine particle (A) is a particle having a cavity in an inside of the particle.
5. The optical film according to claim 1,
wherein the coating composition further contains (D) a non-fluorine-containing polyfunctional monomer.
6. The optical film according to claim 1,
wherein in the polyfunctional fluorine-containing acrylate (C), r is an integer of 0 to 4, and q is an integer of 0 to 3, provided that (p+q) is an integer of 3 to 6.
7. The optical film according to claim 6,
wherein in the polyfunctional fluorine-containing acrylate (C), r is 0 or 1, and q is an integer of 0 to 3, provided that (p+q) is an integer of 3 to 6.
8. The optical film according to claim 1,
wherein a content of (C) the polyfunctional fluorine-containing acrylate in the coating composition is from 5 to 50 mass % based on the entire solid content of the coating composition.
9. The optical film according to claim 1,
wherein the coating composition further contains (E) a polysiloxane-based compound.
10. A polarizing plate, comprising:
at least two protective films; and
a polarizing film between the at least two protective films,
wherein at least one of the at least two protective films is the optical film according to claim 1.
11. An image display device, comprising:
the optical film according to claim 1 on the outermost surface of the display.

* * * * *